(12) United States Patent
Krutka et al.

(10) Patent No.: US 9,352,270 B2
(45) Date of Patent: May 31, 2016

(54) FLUIDIZED BED AND METHOD AND SYSTEM FOR GAS COMPONENT CAPTURE

(75) Inventors: Holly Krutka, Centennial, CO (US); Cody Wilson, Highlands Ranch, CO (US); Travis Starns, Parker, CO (US)

(73) Assignee: ADA-ES, Inc., Highlands Ranch, CO (US)

( * ) Notice: Subject to any disclaimer, the term of this patent is extended or adjusted under 35 U.S.C. 154(b) by 883 days.

(21) Appl. No.: 13/444,119

(22) Filed: Apr. 11, 2012

(65) Prior Publication Data

US 2012/0258029 A1    Oct. 11, 2012

Related U.S. Application Data

(60) Provisional application No. 61/474,103, filed on Apr. 11, 2011.

(51) Int. Cl.
*B01D 53/12* (2006.01)

(52) U.S. Cl.
CPC .......... *B01D 53/12* (2013.01); *B01D 2257/504* (2013.01); *B01D 2258/0283* (2013.01); *B01D 2259/40083* (2013.01); *B01D 2259/40088* (2013.01); *Y02C 10/04* (2013.01); *Y02C 10/06* (2013.01); *Y02C 10/08* (2013.01)

(58) Field of Classification Search
CPC .................. B01D 2257/504; B01D 2258/0283; B01D 2259/40083; B01D 2259/40088; B01D 53/12; Y02C 10/04; Y02C 10/06; Y02C 10/08
See application file for complete search history.

(56) References Cited

U.S. PATENT DOCUMENTS

| | | | |
|---|---|---|---|
| 2,712,728 | A | 7/1955 | Lewis |
| 2,739,105 | A | 3/1956 | Ford |
| 2,819,204 | A | 1/1958 | Martin |
| 2,835,605 | A | 5/1958 | Nelson |
| 2,838,385 | A | 6/1958 | Brown |
| 2,843,462 | A | 7/1958 | Brown |
| 2,843,533 | A | 7/1958 | Smith |
| 2,869,992 | A | 1/1959 | Brown |
| 2,872,384 | A | 2/1959 | Nelson |
| 2,979,388 | A | 4/1961 | Brown |

(Continued)

FOREIGN PATENT DOCUMENTS

| | | |
|---|---|---|
| CN | 101500704 | 8/2009 |
| CN | 101909743 | 12/2010 |

(Continued)

OTHER PUBLICATIONS

International Search Report and Written Opinion for International (PCT) Patent Application No. PCT/US12/33016, mailed Jul. 27, 2012 9 pages.

(Continued)

*Primary Examiner* — Christopher P Jones
(74) *Attorney, Agent, or Firm* — Sheridan Ross P.C.

(57) ABSTRACT

The present disclosure is directed to a process that allows dry sorbents to remove a target constituent, such as carbon dioxide ($CO_2$), from a gas stream. A staged fluidized bed separator enables gas and sorbent to move in opposite directions. The sorbent is loaded with target constituent in the separator. It is then transferred to a regenerator where the target constituent is stripped. The temperature of the separator and regenerator are controlled. After it is removed from the regenerator, the sorbent is then transferred back to the separator.

19 Claims, 10 Drawing Sheets

(56) References Cited

U.S. PATENT DOCUMENTS

| | | |
|---|---|---|
| 2,983,673 A | 5/1961 | Grove |
| 2,984,620 A | 5/1961 | Fleck |
| 2,998,354 A | 8/1961 | Brown |
| 3,131,052 A | 4/1964 | Peras |
| 3,201,491 A | 8/1965 | Stine |
| 3,205,166 A | 9/1965 | Ludlow |
| 3,231,492 A | 1/1966 | Stine |
| 3,274,099 A | 9/1966 | Broughton |
| 3,290,309 A | 12/1966 | Marten |
| 3,310,486 A | 3/1967 | Broughton |
| 3,328,401 A | 6/1967 | Marten |
| 3,442,620 A | 5/1969 | Schora, Jr. |
| 3,574,545 A | 4/1971 | Grantham |
| 3,594,985 A | 7/1971 | Ameen et al. |
| 3,599,610 A | 8/1971 | Spector |
| 3,656,887 A | 4/1972 | Suzuki et al. |
| 3,816,298 A | 6/1974 | Aldridge |
| 3,877,397 A | 4/1975 | Davies |
| 4,021,370 A | 5/1977 | Harris |
| 4,029,862 A | 6/1977 | Liu |
| 4,110,423 A | 8/1978 | Botton |
| 4,115,929 A | 9/1978 | Staub et al. |
| 4,152,122 A | 5/1979 | Feldmann |
| 4,230,602 A | 10/1980 | Bowen |
| 4,254,557 A | 3/1981 | Mayer |
| 4,254,558 A | 3/1981 | Mayer |
| 4,254,616 A | 3/1981 | Siminski |
| 4,255,166 A | 3/1981 | Gernand |
| 4,255,403 A | 3/1981 | Mayer |
| 4,257,171 A | 3/1981 | Johnson et al. |
| 4,274,942 A | 6/1981 | Bartholic |
| 4,283,204 A | 8/1981 | Savage |
| 4,319,892 A | 3/1982 | Waghorne |
| 4,319,893 A | 3/1982 | Hatch |
| 4,353,992 A | 10/1982 | Pannekeet |
| 4,400,181 A | 8/1983 | Snell |
| 4,409,416 A | 10/1983 | Snell |
| 4,410,420 A | 10/1983 | Liss |
| 4,423,274 A | 12/1983 | Daviduk |
| 4,452,612 A | 6/1984 | Mattia |
| 4,472,172 A | 9/1984 | Sheer |
| 4,550,217 A | 10/1985 | Graziani |
| 4,661,258 A | 4/1987 | Phillips |
| 4,848,249 A | 7/1989 | LePori |
| 4,871,485 A | 10/1989 | Rivers |
| 4,965,232 A | 10/1990 | Mauleon |
| 4,973,430 A | 11/1990 | Rivers |
| 4,988,590 A | 1/1991 | Price |
| 4,990,371 A | 2/1991 | Dutta |
| 5,049,198 A | 9/1991 | Ribas |
| 5,049,408 A | 9/1991 | Klinedinst |
| 5,059,404 A | 10/1991 | Mansour |
| 5,061,465 A | 10/1991 | Carter |
| 5,087,427 A | 2/1992 | Quinn |
| 5,198,029 A | 3/1993 | Dutta |
| 5,240,592 A | 8/1993 | Meyer |
| 5,356,845 A | 10/1994 | Clavenna |
| 5,536,488 A | 7/1996 | Mansour |
| 5,545,251 A | 8/1996 | Knop |
| 5,626,741 A | 5/1997 | Mosby |
| 5,637,192 A | 6/1997 | Mansour |
| 5,665,427 A | 9/1997 | Horne |
| 5,733,941 A | 3/1998 | Waycuilis |
| 5,789,331 A | 8/1998 | Tsunoda |
| 6,056,928 A | 5/2000 | Fetzer |
| 6,099,819 A | 8/2000 | Srinivas |
| 6,143,915 A | 11/2000 | Zhou |
| 6,149,765 A | 11/2000 | Mansour |
| 6,160,187 A | 12/2000 | Strickler |
| 6,201,029 B1 | 3/2001 | Waycuilis |
| 6,258,978 B1 | 7/2001 | Kitchen |
| 6,264,738 B1 | 7/2001 | Lorke |
| 6,281,384 B1 | 8/2001 | Contracter et al. |
| 6,310,240 B1 | 10/2001 | Contracter et al. |
| 6,313,361 B1 | 11/2001 | Waycuilis |
| 6,387,337 B1 | 5/2002 | Pennline et al. |
| 6,437,193 B1 | 8/2002 | Contractor et al. |
| 6,525,232 B1 | 2/2003 | Bierl |
| 6,547,854 B1 | 4/2003 | Gray |
| 6,649,130 B1 | 11/2003 | Zhou |
| 6,663,681 B2 | 12/2003 | Kindig |
| 6,716,025 B1 | 4/2004 | Wu |
| 6,755,892 B2 | 6/2004 | Nalette et al. |
| 6,768,036 B2 | 7/2004 | Lattner |
| 6,806,226 B2 | 10/2004 | Van Berge |
| 6,872,364 B2 | 3/2005 | Bierl |
| 6,906,221 B2 | 6/2005 | Zeyss |
| 6,908,497 B1 | 6/2005 | Sirwardane |
| 6,916,953 B2 | 7/2005 | Walsdorff |
| 6,921,834 B2 | 7/2005 | Hickman |
| 6,987,208 B2 | 1/2006 | Risch |
| 7,053,260 B2 | 5/2006 | Xu |
| 7,148,171 B2 | 12/2006 | Lattner |
| 7,491,317 B2 | 2/2009 | Meier et al. |
| 7,531,705 B2 | 5/2009 | Lattner |
| 7,544,339 B2 | 6/2009 | Lissianski et al. |
| 7,557,180 B2 | 7/2009 | Cavaglia |
| 7,579,383 B2 | 8/2009 | Lattner |
| 7,589,246 B2 | 9/2009 | Iaccino |
| 7,615,510 B2 | 11/2009 | McDaniel |
| 7,615,578 B2 | 11/2009 | Lattner |
| 7,642,377 B1 | 1/2010 | Singh |
| 7,659,437 B2 | 2/2010 | Iaccino |
| 7,666,374 B2 | 2/2010 | Grochowski |
| 7,678,954 B2 | 3/2010 | Kuechler |
| 7,683,213 B2 | 3/2010 | Dubois |
| 7,683,227 B2 | 3/2010 | Iaccino |
| 7,686,855 B2 | 3/2010 | Sills |
| 7,699,991 B2 | 4/2010 | Owens |
| 7,708,964 B2 | 5/2010 | Boardman |
| 7,718,811 B2 | 5/2010 | Fiorentino |
| 7,718,832 B1 | 5/2010 | Hurley |
| 7,723,450 B2 | 5/2010 | Jones |
| 7,728,186 B2 | 6/2010 | Iaccino |
| 7,754,930 B2 | 7/2010 | Iaccino |
| 7,759,531 B2 | 7/2010 | Pinkos |
| 7,763,562 B2 | 7/2010 | Voskoboynikov |
| 7,763,765 B2 | 7/2010 | Kuechler |
| 7,767,191 B2 | 8/2010 | Thomas |
| 7,772,335 B1 | 8/2010 | Cao |
| 7,781,636 B2 | 8/2010 | Iaccino |
| 7,785,447 B2 | 8/2010 | Eatough |
| 7,794,690 B2 | 9/2010 | Abatzoglou |
| 7,795,490 B2 | 9/2010 | Iaccino |
| 7,799,118 B2 | 9/2010 | Beech, Jr. |
| 7,819,949 B2 | 10/2010 | Sesing |
| 7,834,108 B2 | 11/2010 | Ogawa |
| 7,838,708 B2 | 11/2010 | Sherman |
| 7,851,663 B2 | 12/2010 | Abhari |
| 7,858,056 B2 | 12/2010 | Moyes |
| 7,867,531 B2 | 1/2011 | Pockat |
| 7,868,108 B2 | 1/2011 | Mihan |
| 7,879,919 B2 | 2/2011 | Ernst |
| 7,892,511 B2 | 2/2011 | Strait |
| 7,893,308 B2 | 2/2011 | Sangar |
| 7,897,812 B2 | 3/2011 | Machhammer |
| 7,901,664 B2 | 3/2011 | Cao |
| 7,915,191 B2 | 3/2011 | Hedrick |
| 7,931,816 B2 | 4/2011 | Conger |
| 7,935,857 B2 | 5/2011 | Beech |
| 7,951,985 B2 | 5/2011 | Sangar |
| 7,955,565 B2 | 6/2011 | Hamba |
| 7,977,479 B2 | 7/2011 | Muller-Hasky |
| 7,977,519 B2 | 7/2011 | Iaccino |
| 7,977,522 B2 | 7/2011 | Takai |
| 7,981,832 B2 | 7/2011 | McDaniel |
| 7,982,080 B2 | 7/2011 | Xu |
| 7,987,613 B2 | 8/2011 | Ness |
| 7,993,591 B2 | 8/2011 | Sato |
| 7,993,593 B2 | 8/2011 | Sato |
| 7,993,594 B2 | 8/2011 | Wei |
| 8,013,200 B2 | 9/2011 | Takai |
| 8,017,019 B2 | 9/2011 | Becker |
| 8,029,893 B2 | 10/2011 | Siegel |

(56) References Cited

U.S. PATENT DOCUMENTS

| | | |
|---|---|---|
| 8,030,420 B2 | 10/2011 | Ogawa |
| 8,512,661 B2 | 8/2013 | Fan et al. |
| 2001/0051589 A1 | 12/2001 | Van Berge |
| 2002/0083833 A1 | 7/2002 | Nalette et al. |
| 2002/0179489 A1 | 12/2002 | Choudhary |
| 2003/0091485 A1 | 5/2003 | Bierl |
| 2003/0113239 A1 | 6/2003 | Pahlman et al. |
| 2003/0125596 A1 | 7/2003 | Lattner |
| 2003/0157008 A1 | 8/2003 | Pahlman et al. |
| 2003/0163010 A1 | 8/2003 | Xu |
| 2003/0199720 A1 | 10/2003 | Lattner |
| 2004/0097760 A1 | 5/2004 | Risch |
| 2004/0204607 A1 | 10/2004 | Machhammer |
| 2004/0226441 A1 | 11/2004 | Palmer |
| 2005/0171311 A1 | 8/2005 | Schindler |
| 2005/0214408 A1 | 9/2005 | Pilkington |
| 2005/0255987 A1 | 11/2005 | McDaniel |
| 2006/0099138 A1 | 5/2006 | Walsdorff |
| 2006/0165574 A1 | 7/2006 | Sayari |
| 2006/0201641 A1 | 9/2006 | Harris |
| 2006/0230930 A1 | 10/2006 | Knaebel |
| 2006/0263290 A1 | 11/2006 | Walsdorff |
| 2007/0027220 A1 | 2/2007 | Lattner |
| 2007/0083073 A1 | 4/2007 | Bagherzadeh |
| 2007/0232844 A1 | 10/2007 | Kuechler |
| 2007/0244208 A1 | 10/2007 | Shulenberger |
| 2007/0249879 A1 | 10/2007 | Iaccino |
| 2007/0249880 A1 | 10/2007 | Iaccino |
| 2007/0253886 A1 | 11/2007 | Abatzoglou |
| 2007/0274898 A1 | 11/2007 | Weber |
| 2007/0274900 A1 | 11/2007 | Bulan |
| 2007/0276171 A9 | 11/2007 | Iaccino |
| 2007/0286793 A1 | 12/2007 | Weber |
| 2007/0286798 A1 | 12/2007 | Cao |
| 2007/0293709 A1 | 12/2007 | Iaccino |
| 2007/0299146 A1 | 12/2007 | Lattner |
| 2008/0027402 A1 | 1/2008 | Schmidt |
| 2008/0029404 A1 | 2/2008 | Weber |
| 2008/0032035 A1 | 2/2008 | Schmidt |
| 2008/0124551 A1 | 5/2008 | Daniel |
| 2008/0154224 A1 | 6/2008 | Daniel |
| 2008/0159948 A1 | 7/2008 | Sesing |
| 2008/0161428 A1 | 7/2008 | Strait |
| 2008/0187756 A1 | 8/2008 | Riegel |
| 2008/0200331 A1 | 8/2008 | Daniel |
| 2008/0233027 A1 | 9/2008 | Brettschneider |
| 2008/0249342 A1 | 10/2008 | Iaccino |
| 2008/0257150 A1 | 10/2008 | Wolf |
| 2008/0260619 A1 | 10/2008 | Werner |
| 2008/0267849 A1 | 10/2008 | Haas |
| 2008/0281136 A1 | 11/2008 | Bagherzadeh |
| 2008/0293976 A1 | 11/2008 | Olah et al. |
| 2009/0048354 A1 | 2/2009 | Bell |
| 2009/0203519 A1 | 8/2009 | Abatzoglou |
| 2009/0205492 A1 | 8/2009 | Andrus et al. |
| 2009/0239736 A1 | 9/2009 | Schmidt |
| 2009/0275789 A1 | 11/2009 | Cao |
| 2009/0304572 A1 | 12/2009 | Sesing |
| 2010/0003439 A1 | 1/2010 | Michie, Jr. |
| 2010/0010256 A1 | 1/2010 | Bulan |
| 2010/0040527 A1 | 2/2010 | Randhava |
| 2010/0044626 A1 | 2/2010 | Fischer |
| 2010/0050517 A1 | 3/2010 | Tsilevich |
| 2010/0063335 A1 | 3/2010 | Xie |
| 2010/0069581 A1 | 3/2010 | Ogawa |
| 2010/0071554 A1 | 3/2010 | Pfeffer |
| 2010/0076164 A1 | 3/2010 | Agapiou |
| 2010/0076222 A1 | 3/2010 | Singh |
| 2010/0077947 A1 | 4/2010 | Hack |
| 2010/0089794 A1 | 4/2010 | Bhan |
| 2010/0092373 A1 | 4/2010 | Soppe |
| 2010/0094039 A1 | 4/2010 | Ooms |
| 2010/0099935 A1 | 4/2010 | Iaccino |
| 2010/0115839 A1 | 5/2010 | Brown et al. |
| 2010/0116746 A1 | 5/2010 | Pfeffer |
| 2010/0121125 A1 | 5/2010 | Hippo |
| 2010/0127429 A1 | 5/2010 | Scott |
| 2010/0132259 A1 | 6/2010 | Haque |
| 2010/0132359 A1 | 6/2010 | Minhas |
| 2010/0173767 A1 | 7/2010 | Koch |
| 2010/0174129 A1 | 7/2010 | Bauman |
| 2010/0179232 A1 | 7/2010 | Robinson |
| 2010/0179296 A1 | 7/2010 | Vermeiren |
| 2010/0180771 A1 | 7/2010 | Liu |
| 2010/0183498 A1 | 7/2010 | Wolf |
| 2010/0184927 A1 | 7/2010 | Hagerty |
| 2010/0184933 A1 | 7/2010 | Vermeiren |
| 2010/0184976 A1 | 7/2010 | Kuhrs |
| 2010/0187161 A1 | 7/2010 | Anastasijevic |
| 2010/0196253 A1 | 8/2010 | Becnel |
| 2010/0197986 A1 | 8/2010 | Midorikawa |
| 2010/0200458 A1 | 8/2010 | Kalnes |
| 2010/0203495 A1 | 8/2010 | Medoff |
| 2010/0203607 A1 | 8/2010 | Medoff |
| 2010/0205863 A1 | 8/2010 | Biollaz |
| 2010/0209322 A1 | 8/2010 | Mesters |
| 2010/0212550 A1 | 8/2010 | Zhang |
| 2010/0216629 A1 | 8/2010 | Vermeiren |
| 2010/0217035 A1 | 8/2010 | Knoesche |
| 2010/0221475 A1 | 9/2010 | Sukhadia |
| 2010/0222527 A1 | 9/2010 | Sukhadia |
| 2010/0222582 A1 | 9/2010 | Kern |
| 2010/0224835 A1 | 9/2010 | Chornet |
| 2010/0228062 A1 | 9/2010 | Babicki |
| 2010/0237290 A1 | 9/2010 | Rolland |
| 2010/0240935 A1 | 9/2010 | Iaccino |
| 2010/0240937 A1 | 9/2010 | Gartside |
| 2010/0249007 A1 | 9/2010 | Holderbaum |
| 2010/0249009 A1 | 9/2010 | Holderbaum |
| 2010/0249355 A1 | 9/2010 | Davis |
| 2010/0255985 A1 | 10/2010 | Gaffney |
| 2010/0255986 A1 | 10/2010 | Gaffney |
| 2010/0256245 A1 | 10/2010 | Iaccino |
| 2010/0256316 A1 | 10/2010 | Vermeiren |
| 2010/0256432 A1 | 10/2010 | Arnold |
| 2010/0261892 A1 | 10/2010 | Weisser |
| 2010/0263534 A1 | 10/2010 | Chuang |
| 2010/0266477 A1 | 10/2010 | Ishii |
| 2010/0266481 A1 | 10/2010 | Haas |
| 2010/0266702 A1 | 10/2010 | Cousin |
| 2010/0266795 A1 | 10/2010 | Pockat |
| 2010/0266908 A1 | 10/2010 | de Graffenried, Sr. |
| 2010/0269411 A1 | 10/2010 | Goetsch |
| 2010/0270506 A1 | 10/2010 | Goetsch |
| 2010/0281878 A1 | 11/2010 | Wormser |
| 2010/0282079 A1 | 11/2010 | Boerrigter |
| 2010/0287835 A1 | 11/2010 | Reiling |
| 2010/0287836 A1 | 11/2010 | Robinson |
| 2010/0292350 A1 | 11/2010 | Robinson |
| 2010/0292417 A1 | 11/2010 | Nesterenko |
| 2010/0294642 A1 | 11/2010 | Datta |
| 2010/0300112 A1 | 12/2010 | Hannemann |
| 2010/0305374 A1 | 12/2010 | Iaccino |
| 2010/0311923 A1 | 12/2010 | Sato |
| 2010/0317077 A1 | 12/2010 | Gaddy |
| 2010/0320121 A1 | 12/2010 | Bauman |
| 2010/0324157 A1 | 12/2010 | Bauman |
| 2010/0329963 A1 | 12/2010 | Sceats |
| 2010/0331502 A1 | 12/2010 | Hecker |
| 2010/0331592 A1 | 12/2010 | Sangar |
| 2011/0009501 A1 | 1/2011 | Ernst |
| 2011/0021796 A1 | 1/2011 | Saebo |
| 2011/0021857 A1 | 1/2011 | Cao |
| 2011/0027170 A1 | 2/2011 | Lee |
| 2011/0031439 A1 | 2/2011 | Sirdeshpande |
| 2011/0034741 A1 | 2/2011 | Sherman |
| 2011/0034746 A1 | 2/2011 | Koster |
| 2011/0035990 A1 | 2/2011 | Kammerloher |
| 2011/0036014 A1 | 2/2011 | Tsangaris |
| 2011/0042620 A1 | 2/2011 | Singh |
| 2011/0042621 A1 | 2/2011 | Price |
| 2011/0054049 A1 | 3/2011 | Lambert |
| 2011/0054232 A1 | 3/2011 | Sangar |
| 2011/0059497 A1 | 3/2011 | Beckler Andersen et al. |

(56) References Cited

U.S. PATENT DOCUMENTS

| | | |
|---|---|---|
| 2011/0062012 A1 | 3/2011 | Robinson |
| 2011/0062721 A1 | 3/2011 | Sirdeshpande |
| 2011/0062722 A1 | 3/2011 | Sirdeshpande |
| 2011/0064648 A1 | 3/2011 | Preston |
| 2011/0071264 A1 | 3/2011 | Nesterenko |
| 2011/0073687 A1 | 3/2011 | Makino |
| 2011/0077441 A1 | 3/2011 | Iaccino |
| 2011/0078951 A1 | 4/2011 | Blasiak |
| 2011/0085962 A1 | 4/2011 | Harris |
| 2011/0088550 A1 | 4/2011 | Tirio |
| 2011/0088896 A1 | 4/2011 | Preston |
| 2011/0088897 A1 | 4/2011 | Raman |
| 2011/0091394 A1 | 4/2011 | Abelyan |
| 2011/0091600 A1 | 4/2011 | Abelyan |
| 2011/0091602 A1 | 4/2011 | Abelyan |
| 2011/0091608 A1 | 4/2011 | Abelyan |
| 2011/0091617 A1 | 4/2011 | Abelyan |
| 2011/0091628 A1 | 4/2011 | Abelyan |
| 2011/0091629 A1 | 4/2011 | Abelyan |
| 2011/0091630 A1 | 4/2011 | Abelyan |
| 2011/0091633 A1 | 4/2011 | Abelyan |
| 2011/0091634 A1 | 4/2011 | Abelyan |
| 2011/0091635 A1 | 4/2011 | Abelyan |
| 2011/0091637 A1 | 4/2011 | Abelyan |
| 2011/0092684 A1 | 4/2011 | Abelyan |
| 2011/0097673 A1 | 4/2011 | Forret |
| 2011/0110849 A1 | 5/2011 | Siemons |
| 2011/0113779 A1 | 5/2011 | Polvi |
| 2011/0118425 A1 | 5/2011 | Nesterenko |
| 2011/0118518 A1 | 5/2011 | Nesterenko |
| 2011/0120266 A1 | 5/2011 | Burgler |
| 2011/0120560 A1 | 5/2011 | Proll |
| 2011/0123423 A1 | 5/2011 | Ciambelli |
| 2011/0123432 A1 | 5/2011 | Waycuilis |
| 2011/0124927 A1 | 5/2011 | Stites |
| 2011/0130271 A1 | 6/2011 | Wagner |
| 2011/0136213 A1 | 6/2011 | Stewart |
| 2011/0146155 A1 | 6/2011 | Bentzen |
| 2011/0146978 A1 | 6/2011 | Perlman |
| 2011/0146979 A1 | 6/2011 | Wallace |
| 2011/0152454 A1 | 6/2011 | Devisme |
| 2011/0155669 A1 | 6/2011 | Pan et al. |
| 2011/0159165 A1 | 6/2011 | Nair |
| 2011/0162275 A1 | 7/2011 | Hladun |
| 2011/0167713 A1 | 7/2011 | Quignard |
| 2011/0173836 A1 | 7/2011 | Orr |
| 2011/0174203 A1 | 7/2011 | Salatino |
| 2011/0176968 A1 | 7/2011 | Fan |
| 2011/0196183 A1 | 8/2011 | Nesterenko |
| 2011/0197791 A1 | 8/2011 | Landreth |
| 2011/0206594 A1 | 8/2011 | Singh |
| 2011/0207061 A1 | 8/2011 | Cantwell |
| 2011/0210292 A1 | 9/2011 | Ariyapadi |
| 2011/0213188 A1 | 9/2011 | Agblevor |
| 2011/0214309 A1 | 9/2011 | Ness |
| 2011/0214425 A1 | 9/2011 | Lang |
| 2011/0217210 A1 | 9/2011 | Katoh |
| 2011/0218372 A1 | 9/2011 | Waycuilis |
| 2011/0218374 A1 | 9/2011 | Waycuilis |
| 2011/0219770 A1 | 9/2011 | Minhas |
| 2011/0219802 A1 | 9/2011 | Minhas |
| 2011/0220548 A1 | 9/2011 | Roux |
| 2011/0220744 A1 | 9/2011 | Zhao |
| 2011/0224391 A1 | 9/2011 | Hagadorn |
| 2011/0230629 A1 | 9/2011 | Mihan |
| 2011/0232305 A1 | 9/2011 | Minhas |
| 2011/0236291 A1 | 9/2011 | Lang |
| 2011/0240923 A1 | 10/2011 | Sarkar |
| 2011/0245355 A1 | 10/2011 | Loosdrecht |
| 2011/0245444 A1 | 10/2011 | Miller |
| 2012/0094364 A1* | 4/2012 | Lali et al. .................. 435/283.1 |
| 2012/0316955 A1 | 12/2012 | Panguluri et al. |
| 2013/0291721 A1 | 11/2013 | Silverman et al. |
| 2014/0161697 A1 | 6/2014 | Leta et al. |

FOREIGN PATENT DOCUMENTS

| | | |
|---|---|---|
| CN | 101970938 | 2/2011 |
| FR | 2152666 | 4/1973 |
| GB | 2167397 | 5/1986 |
| WO | WO 02/06637 | 1/2002 |
| WO | WO 2009/026637 | 3/2009 |
| WO | WO 2011/016906 | 2/2011 |

OTHER PUBLICATIONS

International Preliminary Report on Patentability for International (PCT) Patent Application No. PCT/US12/33016, mailed Oct. 24, 2013, 7 pages.

Prior Art Search for U.S. Appl. No. 13/444,119, Oct. 11, 2011, 214 pages.

Choi et al., "Adsorbent Materials for Carbon Dixoide Capture from Large Anthropogenic Point Sources," Chem SUS Chem, 2009, vol. 2(9), pp. 796-854.

Drage et al, "Development of Adsorbent Technologies for Post Combustion $CO_2$ Capture," Energy Procedia, 2009, vol. 1, pp. 881-884.

U.S. Appl. No. 14/032,030, filed Sep. 19, 2013, Kruftka.

Gray et al., "Parametric Study of Solid Amine Sorbents for the Capture of Carbon Dioxide," Energy & Fuels, 2009, vol. 23, pp. 4840-4844.

Gray et al., "Systematic Design of Immobilized Solid Amine Sorbents for the Capture of Carbon Dioxide," Sixth Annual Conference on Carbon Capture and Sequestration, Pittsburgh, PA, May 2007.

Samanta et al., "Post-Combustion $CO_2$ Capture Using Solid Sorbents-A Review," Ind. Eng. Chem. Res., 2012, vol. 54(4), pp. 1438-1463.

Sjostrom et al., "Evaluation of Solid Sorbents as a Retrofit Technology of $CO_2$ Capture," Fuel, 2010, vol. 89, pp. 1298-1306.

International Search Report and Written Opinion for International (PCT) Patent Application No. PCT/US2013/036159, mailed Sep. 18, 2013 14 pages.

International Search Report and Written Opinion for International (PCT) Patent Application No. PCT/US2013/060721, mailed Feb. 4, 2014 16 pages.

Han et al., "Powder Technology Dictionary," 1999, 4 pages. (No English translation available).

Luo et al., "Fluidized Sorting Theory," 202, 4 pages (No English translation available).

Preliminary Search Report (English translation) for Chinese Patent Application No. 201280028787.1, dated Feb. 10, 2015, 2 pages.

Official Action (English translation) for Chinese Patent Application No. 201280028787.1, dated Feb. 17, 2015, 10 pages.

International Preliminary Report on Patentability for International (PCT) Patent Application No. PCT/US2013/036159, mailed Oct. 23, 2014 12 pages.

International Preliminary Report on Patentability for International (PCT) Patent Application No. PCT/US2013/060721, mailed Apr. 2, 2015 15 pages.

Official Action for U.S. Appl. No. 13/861,183, mailed Feb. 20, 2015, 5 pages.

Official Action for U.S. Appl. No. 13/861,183, mailed Apr. 13, 2015, 8 pages.

Official Action for U.S. Appl. No. 13/861,183, mailed Sep. 29, 2015 9 pages.

Official Action for U.S. Appl. No. 14/032,030, mailed Jul. 15, 2015 8 pages.

Notice of Allowance for U.S. Appl. No. 14/032,030, mailed Oct. 27, 2015 5 pages.

\* cited by examiner

FLUIDIZED BED AND METHOD AND SYSTEM FOR GAS COMPONENT CAPTURE

CROSS REFERENCE TO RELATED APPLICATION

The present application claims the benefits of U.S. Provisional Application Ser. No. 61/474,103, filed Apr. 11, 2011, entitled "Staged Fluidized Beds for CO2 Capture", which is incorporated herein by this reference in its entirety.

STATEMENT REGARDING FEDERALLY SPONSORED RESEARCH OR DEVELOPMENT

A portion of the project under which this invention was developed was supported by the Department of Energy (DOE) under Award number DE-FE0004343. This project was funded by the DOE National Energy Technology Laboratory's Innovations for Existing Plants (IEP) Program.

FIELD

The disclosure relates generally to gas stream treatment and particularly to separation of a selected constituent from a gas stream.

BACKGROUND

The use of fossil fuels for electricity, power, or heat, as well as the extraction of natural gas can create emissions of carbon dioxide ($CO_2$). $CO_2$ emissions are increasingly targeted by regulatory authorities.

There are many different solid sorbents under development for $CO_2$ capture from flue gas streams, and while the entire field is extensive, a few sorbent related patents are mentioned only for reference. For example, Siriwardane discussed amine-treated sorbents (U.S. Pat. No. 6,908,497) that could be used for $CO_2$ capture at low temperature, which could be regenerated by heating to temperatures in excess of 35° C. In addition, Gray et al. discussed a new method for making low-cost dry amine sorbents (U.S. Pat. No. 6,547,854). Sayari also used amine functionalization of mesoporous silica to create a potential $CO_2$ sorbent (US 2006/0165574). Finally, Tirio proposed the use of an ion exchange resin for $CO_2$ capture (US Application 2011/0088550).

While the sorbent is important to the effectiveness and costs related to $CO_2$ capture, the process and related equipment are also of high importance. Several different groups have proposed different process configurations for $CO_2$ capture. The most relevant works that utilize a temperature swing (possibly in addition to a pressure or partial pressure swing) are discussed. Several proposals have been made to utilize a process where the sorbent remains stationary, such as using fixed beds that can be operated for either adsorption or regeneration (U.S. Pat. No. 6,755,892 and WO 02/06637). One concern with a fixed bed system is that the actual bed and support structure itself would need to be heated up and cooled down for each regeneration and adsorption step, respectively. This can be avoided by moving the sorbent between separate separator and regenerator vessels. A moving bed system with cross flow was proposed by Pennline et al. (U.S. Pat. No. 6,387,337). While the proposed moving bed system offers low pressure drop, the contact time between the gas and sorbent is low; in addition, heat removal during adsorption is difficult. To increase the contact time between the sorbent and gas and maximize the $CO_2$ delta loading of the sorbent, Knaebel proposed using a counter-current reactor with internal cooling during adsorption (US 2006/0230930). Knaebel also proposed to lower the sensible heat requirements by transferring heat from the hot sorbent after it is regenerated to the cool sorbent entering the separator. While the counter current design would effectively maximize the $CO_2$ loading on the sorbent, heat and mass transfer in such a system are unlikely to be sufficient to manage the heat generated during the exothermic adsorption and the heat lost due to the endothermic regeneration. Finally, gas/solids contacting in a moving bed system can be inefficient. It is highly desirable for $CO_2$ adsorption/regeneration reactors to demonstrate effective mass and heat transfer.

SUMMARY

These and other needs are addressed by the various aspects, embodiments, and configurations of the present disclosure. The disclosure is related generally to the use of solid sorbents to remove a target constituent from a gas stream.

In an embodiment, a method is provided that includes the steps:

(a) receiving a gas stream comprising a target constituent to be removed by a solid sorbent;

(b) fluidizing sequentially a series of beds of the sorbent with the gas stream to sorb the target constituent on the sorbent in the beds, wherein a direction of flow of the gas stream is counter to a direction of flow of sorbent from a first of the beds to a second of the beds;

(c) removing a target constituent-loaded sorbent from a last of the beds; and (d) desorbing the constituent from the constituent-loaded sorbent to form a target constituent-rich product gas and a constituent-lean sorbent for recycle to a selected one of the beds.

In an embodiment, a method is provided that includes the steps:

(a) fluidizing sequentially a series of one or more beds of target constituent-loaded solid sorbent with a gas stream to desorb, into the gas phase, the target constituent from the solid sorbent in the beds and form a lean solid sorbent, wherein for the case of a plurality of beds a direction of flow of the gas stream is counter to a direction of flow of the target constituent-loaded solid sorbent from a first of the beds to a second of the beds; and (b) collecting, as a product gas, the desorbed target constituent.

The target constituent, in one application, is $CO_2$.

The gas stream, which can for instance be flue gas generated by a coal-fired power plant, natural gas combined cycle power plant, biomass-fired power plant, co-fired power plant, co-production facility, oil or natural gas refinery, or some other industrial-scale gas stream, passes through the fluidized beds while the sorbent moves in the opposite direction through the beds. The gas stream acts as a fluidizing media. Heat generated in the fluidized beds in the separator can be removed using internal cooling.

The $CO_2$ laden sorbent is removed from the last fluidized bed (in the last fluidized bed the $CO_2$ partial pressure is greater than in any of the other fluidized beds).

After the sorbent is removed from the last fluidized bed it is conveyed to a separate regenerator where the sorbent is regenerated and the $CO_2$ is released as a gas. The regenerator can itself be one or more fluidized beds with internal heat transfer. The $CO_2$ is released by the sorbent in the regenerator due to a temperature increase, vacuum swing, or partial pressure swing. The sorbent is conveyed from the regenerator to the separator and is reused again in the separator. In this manner, the sorbent can be used for multiple adsorption/regeneration cycles.

The above aspects can effectively reduce the cost and energy penalty for $CO_2$ capture compared to aqueous amine $CO_2$ capture systems. Dry sorbents have demonstrated a lower specific heat capacity compared to water (which makes up the majority of the solution for aqueous amine $CO_2$ capture systems). A lower specific heat capacity can reduce the sensible heat required in a temperature swing process. In addition, the latent heat of evaporation of water can be significantly less than that characteristic of an aqueous amine $CO_2$ capture system because less water is evaporated in the regenerator when using dry sorbents. Finally, there can be significantly less aqueous waste generated by a dry sorbent-based $CO_2$ capture system, which will become increasingly important as water waste regulations are implemented in the future.

The present disclosure can provide a number of advantages depending on the particular configuration. Fluidized bed $CO_2$ adsorption with dry sorbents can significantly reduce the cost, energy penalty, and aqueous waste generated due to $CO_2$ capture. The fluidized bed $CO_2$ capture process can enable the removal and addition of heat to counteract the temperature effect due to the exothermic reaction between the $CO_2$ and the sorbent during adsorption and the endothermic reaction between $CO_2$ and the sorbent during regeneration. It can maximize the driving force for $CO_2$ uptake while managing the heat generated during adsorption and can provide an efficient mechanism for regeneration of the loaded sorbent. Fluidized beds are uniquely suited to maximize heat transfer, while staged fluidized beds can be used to increase the $CO_2$ uptake driving force and maximize the $CO_2$ delta loading.

These and other advantages will be apparent from the disclosure of the aspects, embodiments, and configurations contained herein.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces) or chemisorption (characteristic of covalent bonding). It may also occur due to electrostatic attraction.

"Ash" refers to the residue remaining after complete combustion of the coal particles. Ash typically includes mineral matter (silica, alumina, iron oxide, etc.).

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Coal" refers to a combustible material formed from prehistoric plant life. Coal includes, without limitation, peat, lignite, sub-bituminous coal, bituminous coal, steam coal, waste coal, anthracite, and graphite. Chemically, coal is a macromolecular network comprised of groups of polynuclear aromatic rings, to which are attached subordinate rings connected by oxygen, sulfur, and aliphatic bridges.

A "fluidized bed" is formed when a quantity of a solid particulate substance (usually present in a holding vessel) is placed under appropriate conditions to cause the solid/fluid mixture to behave as a fluid. This is usually achieved by the introduction of pressurized fluid through the particulate medium.

"Fluidization" refers to a process similar to liquefaction whereby a granular material is converted from a static solid-like state to a dynamic fluid-like state. This process occurs when a fluid (liquid or gas) is passed up through the granular material.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

"Particulate" refers to fine particles, such as fly ash, unburned carbon, soot and fine process solids, typically entrained in a gas stream.

"Separating" and cognates thereof refer to setting apart, keeping apart, sorting, removing from a mixture or combination, or isolating.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of sorption.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Overview

Figure 8:
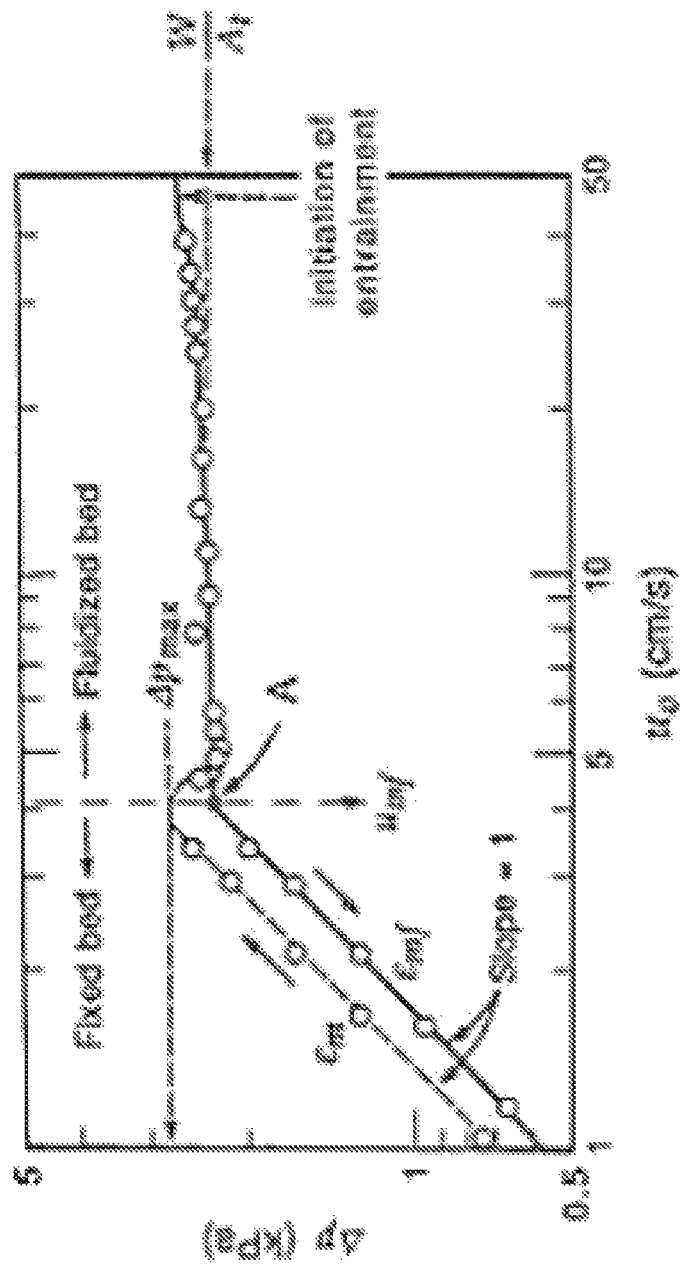
FIG. 8 is a prior art plot of bed pressure drop $\Delta p$ (kPa) versus fluidization velocity $u_o$ (cm/s)
Figure 9:
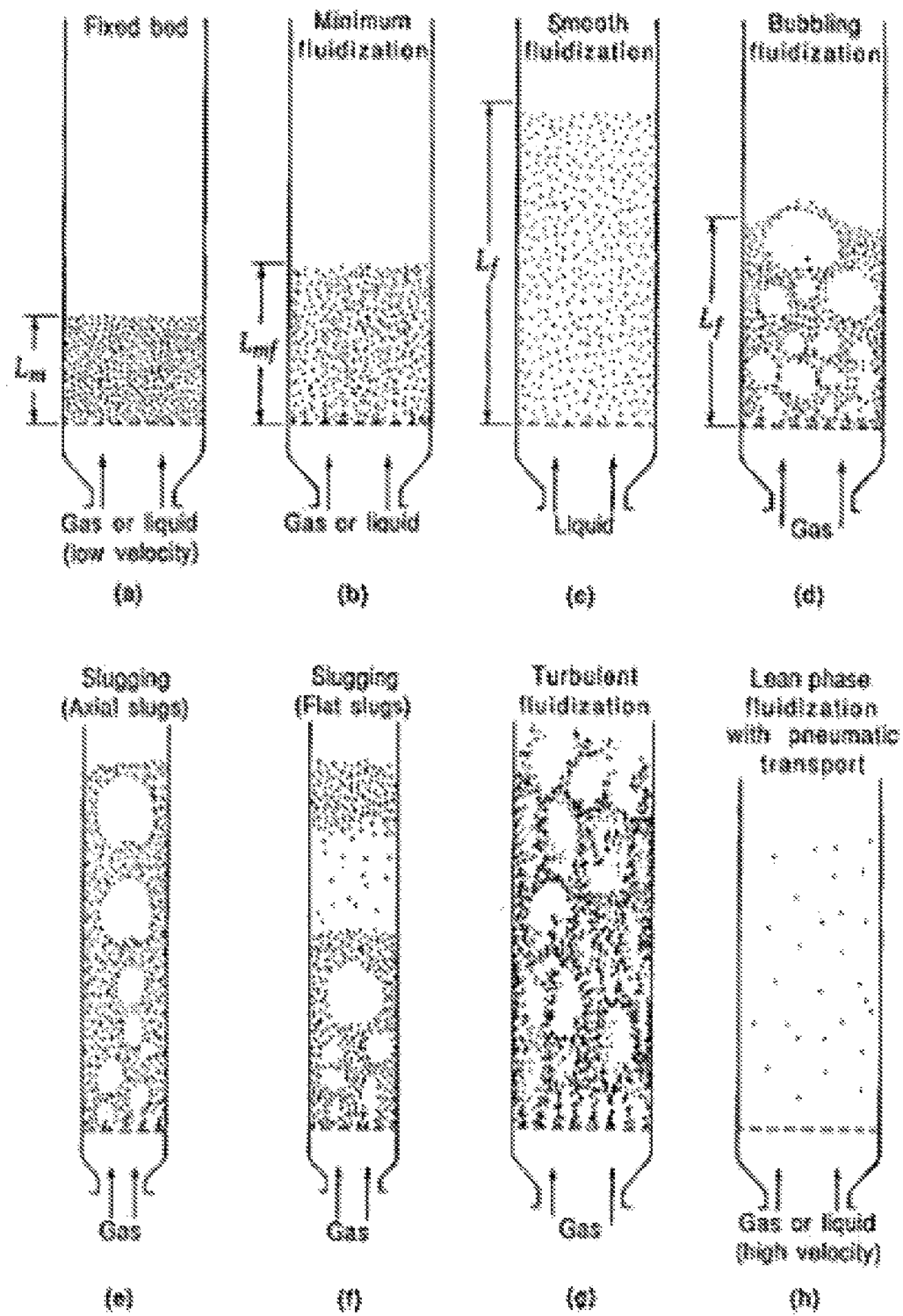
FIG. 9 depicts various fluidization regimes according to the prior art.
Figure 10:
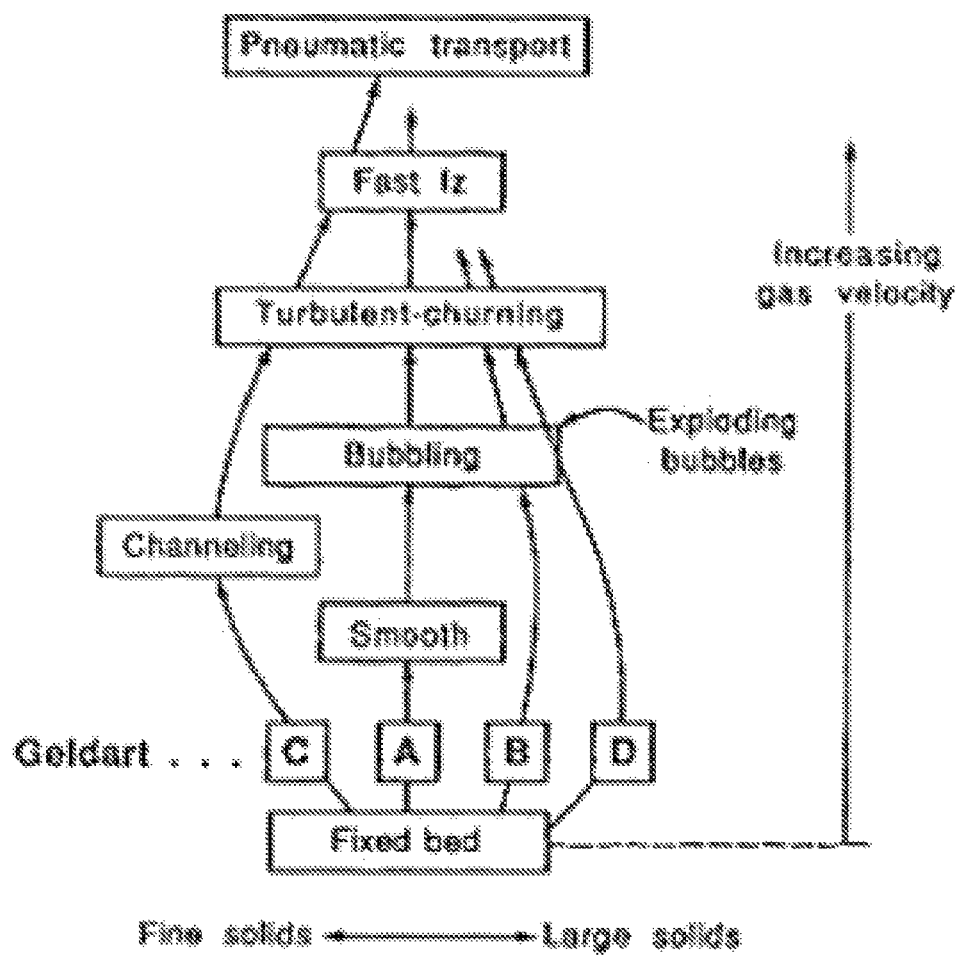
FIG. 10, which is prior art, depicts various fluidization regimes as a function of Geldart behavior.

The separation system of the present disclosure uses fluidized beds, particularly plural staged fluidized beds, to provide the mass and heat transfer rates required for sorbent removal or separation of a selected gas constituent, such as $CO_2$, CO, $H_2O$, $SO_x$, and $NO_x$, and/or other sorbable constituent(s), from a gas stream. While not wishing to be bound by any theory, when sorbent particle properties behave as a Geldart A material the bed of sorbent can behave differently based on the gas velocity. As illustrated by FIGS. 8-10, with increasing fluidization gas velocity the sorbent bed will move from a first fluidization regime to a second fluidization regime, as shown below:

fixed or packed bed→particulate (or minimum fluidization)→bubbling bed or fluidization→slug flow or slugging→turbulent fluidization→fast fluidization→pneumatic conveying The sorbent in the fluidized bed can be any solid or semi-solid (non-liquid) material that sorbs the selected gas stream constituent. For $CO_2$, for example, the sorbent can be an amine-treated or amine-containing sorbent, an amine functionalized mesoporous or microporous silica, an ion exchange resin, as well as sorbents that do not contain an amine component and rely on physical sorption, and the like.

According to one embodiment, the fluidized bed separation system operates in the bubbling fluidization regime, which (as shown by FIG. 9(d)) is commonly characterized by gas bubbles that reach a maximum size and do not continue to grow beyond that size. The movement of the gas bubbles promotes mixing of the sorbent, effective gas/solids contact, and effective heat transfer when desired. In this type of fluidized bed, the bed of sorbent is considered to be well mixed (modeled as a continuously stirred tank reactor (CSTR)).

In one embodiment, the separation system removes $CO_2$ from a waste or flue gas stream generated by a coal-fired power plant, natural gas combined cycle power plan, co-production facility, biomass-fired power plant, oil or natural gas refinery, or some other industrial-scale gas stream. The separation system uses a dry sorbent-based $CO_2$ capture process that can remove and add heat as necessary while maintaining effective mass transfer. The process is designed in such a way that it can be utilized for many different potential sorbents. The $CO_2$, and optionally $H_2O$, is sorbed onto the sorbent through either chemical and/or physical reaction(s). In one configuration, the $CO_2$ is sorbed in a vessel called a separator. Once the sorbent has achieved sufficient $CO_2$ loading it is transferred to a regenerator where an increase in temperature promotes the release of the $CO_2$.

Figure 1:
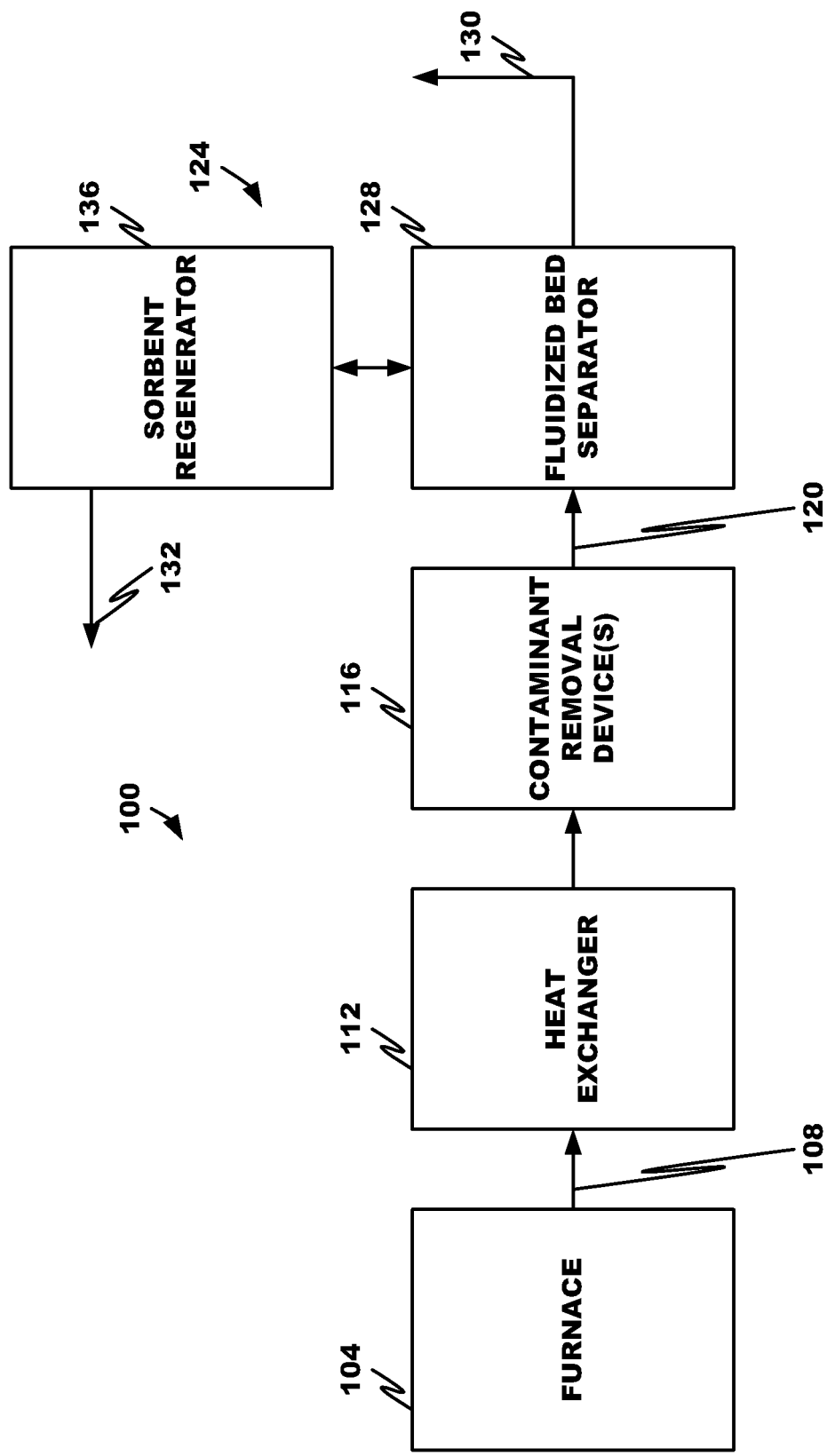
FIG. 1 is a block diagram of a typical waste gas stream treatment with an embodiment of the disclosure downstream of the contaminant removal devices.

FIG. 1 depicts an exemplary plant 100 for a coal-fired power plant, natural gas combined cycle power plan, co-production facility, biomass-fired power plant, waste incinerator, and the like. A feed material, such as coal, is combusted in a furnace 104, which produces a gas stream 108. The gas stream 108 typically contains many impurities and/or contaminants, including acid gas(es), particulates, elemental and speciated mercury, uncombusted hydrocarbons (such as coal, ash, methane, propane, ethane, and the like), carbon oxides (CO and $CO_2$), water vapor, and the like. A gas stream comprises typically at least about 1 vol % $CO_2$ and more typically at least about 5 vol % $CO_2$ and typically no more than about 15 vol % $CO_2$ and more typically no more than about 20 vol % $CO_2$.

The gas stream 108 is passed through a heat exchanger 112 to transfer thermal energy to an oxygen-containing gas to be introduced into the furnace 104 and then through one or more contaminant removal device(s) 116 to remove selected contaminants, such as acid gas(es), particulates, and/or mercury. Common devices for removal of acid gas(es) include dry and wet scrubbers; for removal of particulates include electrostatic precipitators and baghouses; and for removal of mercury include additives, particularly powdered activated carbon and halogens.

Figure 2:
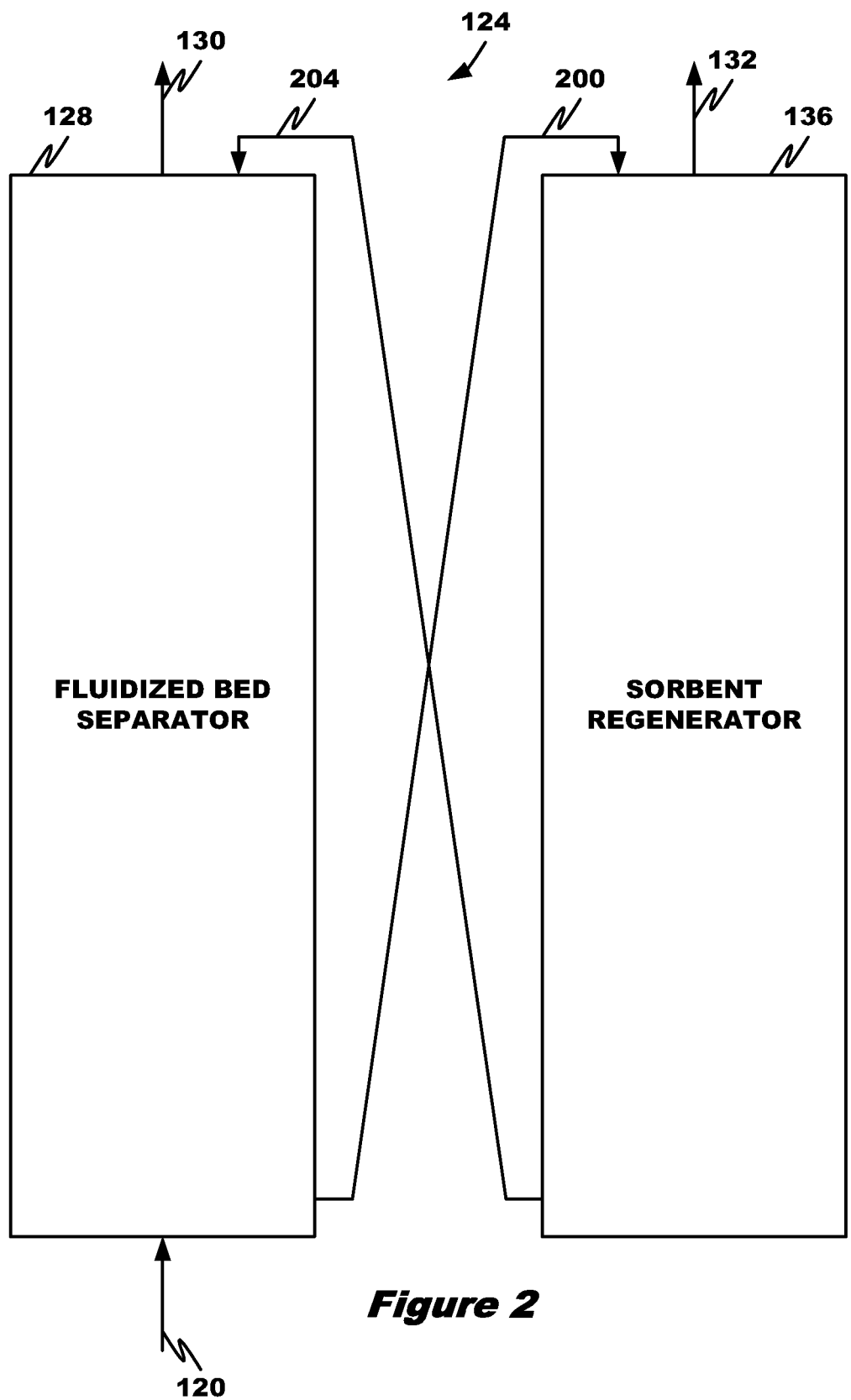
FIG. 2 is a block diagram of a separation system according to an embodiment of the disclosure.

With reference to FIGS. 1 and 2, the treated gas stream 120 is next introduced into a fluidized bed separator 138 of the fluidized bed separation system 124 to remove commonly most, more commonly about 50% or more, and even more commonly about 85% or more of the $CO_2$ from the treated gas stream 120 and form a purified gas stream 130, a $CO_2$-rich product gas 132, and a $CO_2$ loaded sorbent 200. The $CO_2$ loaded sorbent 200 is introduced into a sorbent regenerator 136 for evolution of the sorbed gas constituent (i.e., $CO_2$) from the sorbent to form a lean sorbent 204 for recycle to the fluidized bed separator 138 and the $CO_2$-rich product gas 132.

FIG. 2 depicts a counter-current system where the treated gas stream 120 enters one side of the fluidized bed separator 138 while the $CO_2$ lean sorbent 204 enters the opposite side. Typically and as shown in FIG. 2, the treated gas stream 120 and sorbent flow counter-currently; that is, the treated gas stream 120 flows upwards, while the lean sorbent 204 travels downwards.

The $CO_2$ can be evolved by any suitable mechanism, including pressure and/or temperature swing. In the former mechanism, a pressure differential exists between the operating pressures in the fluidized bed separator 138 and the sorbent regenerator 136, which causes the $CO_2$ to enter the gas phase. In the case where pressure swing is utilized, the operating pressure in the fluidized bed separator 138 is usually greater than the operating pressure in the sorbent regenerator 136. Relative to ambient pressure, the operating pressures can be positive or negative (e.g., under vacuum). In the latter mechanism, a temperature differential exists between the operating temperatures in the fluidized bed separator 138 and the sorbent regenerator 136, which causes the $CO_2$ to enter the gas phase. Generally, the operating temperature in the fluidized bed separator 138 is less than the operating temperature in the sorbent regenerator 136.

In one configuration, the sorbent regenerator 136 utilizes a change in temperature, total pressure, or partial pressure to regenerate the sorbent and release the $CO_2$. When a temperature increase is utilized to regenerate the sorbent in the regenerator, the temperature can be increased through direct, indirect, or a combination of direct and indirect heating. The heat input should be sufficient to address both the sensible heat required to change the temperature of the sorbent as well as overcome the enthalpy of reaction required to release the $CO_2$ and any other sorbed constituents, which may be endothermic. In one application, a sweep gas, either steam or a mixture of steam and $CO_2$, is injected into the sorbent regenerator 136. In one design, the sorbent regenerator 136 includes plural staged fluidized beds, similar to the fluidized bed separator 128. The $CO_2$ lean sorbent 204 can be extracted from the last stage (where $CO_2$ loading is lower than other stages). In another design, the regenerator 136 is a single fluidized bed.

The purified gas stream 130 commonly contains no more than about 1000 ppm, more commonly no more than about 2 vol %, and even more commonly no more than about 10 vol % $CO_2$. Because most of the other contaminants referenced above have been removed from the gas stream 108 by the contaminant removal device(s) 116, the purified gas stream 130 can be discharged into the atmosphere via a stack (not shown).

A $CO_2$-rich product gas 132 commonly contains most, more commonly about 75% or more, and even more commonly about 90% or more of the $CO_2$ removed from the treated gas stream 120. The $CO_2$-rich product gas 132 commonly has a relatively high purity of $CO_2$ with a relatively low impurity content. The $CO_2$-rich product gas 132 typically contains from about 1 vol % to about 99 vol %, more typically from about 25 vol % to about 95 vol %, and even more typically from about 50 vol % to about 90 vol. % $CO_2$ and from about 1000 ppm to about 90 vol %, more typically from about 1 vol % to about 50 vol %, and even more typically from about 5 vol % to about 15 vol. % water vapor. The balance of the $CO_2$-rich product gas 132 is comprised of impurities including molecular oxygen, nitrogen, and carbon monoxide.

Staged Fluidized Beds

As will be appreciated, there are several different approaches to obtaining or approaching counter current gas/solids contacting. The sorbent-to-gas ratio may vary inside the fluidized bed separator 128 depending on fluidized bed hydrodynamics and adsorption kinetics. Preferably, the fluidized bed separation system 124 uses a reactor that not only approaches counter current gas/solids contacting but also demonstrates effective mass and heat transfer that could be utilized for $CO_2$ capture.

There are several reasons that a standard counter-current system may not be ideal when using solids for $CO_2$ capture from a large gas stream. For example, the gas/solids mixing may not be sufficient. In addition, the heat transfer could be inefficient, and it may be difficult to design the reactor to include adequate heat transfer surface area; that is, when the sorbent and $CO_2$ react in an exothermic manner and heat is not removed a temperature bulge is caused. To address the mass and heat transfer concerns while still maximizing the driving force for $CO_2$ capture, staged fluidized beds are utilized in one embodiment.

Staged fluidized beds can be used to approach counter current contacting (i.e., an infinite number of stages can result in counter current contacting). When staged fluidized beds are used, the size (i.e., diameter or width in the direction perpendicular to the average fluidizing gas flow) of the fluidized bed separator 128 is based on the requisite gas flow rate or gas velocity to fluidize effectively the sorbent particles, thereby providing adequate gas/solids contacting, maximizing heat and mass transfer, and minimizing sorbent entrainment (i.e., bubbling fluidized bed regime). In some cases it may be preferable to use multiple trains to treat a large stream of gas due to limitations on fabrication and manufacturing constraints of vessels with prohibitively large diameters.

Figure 3:
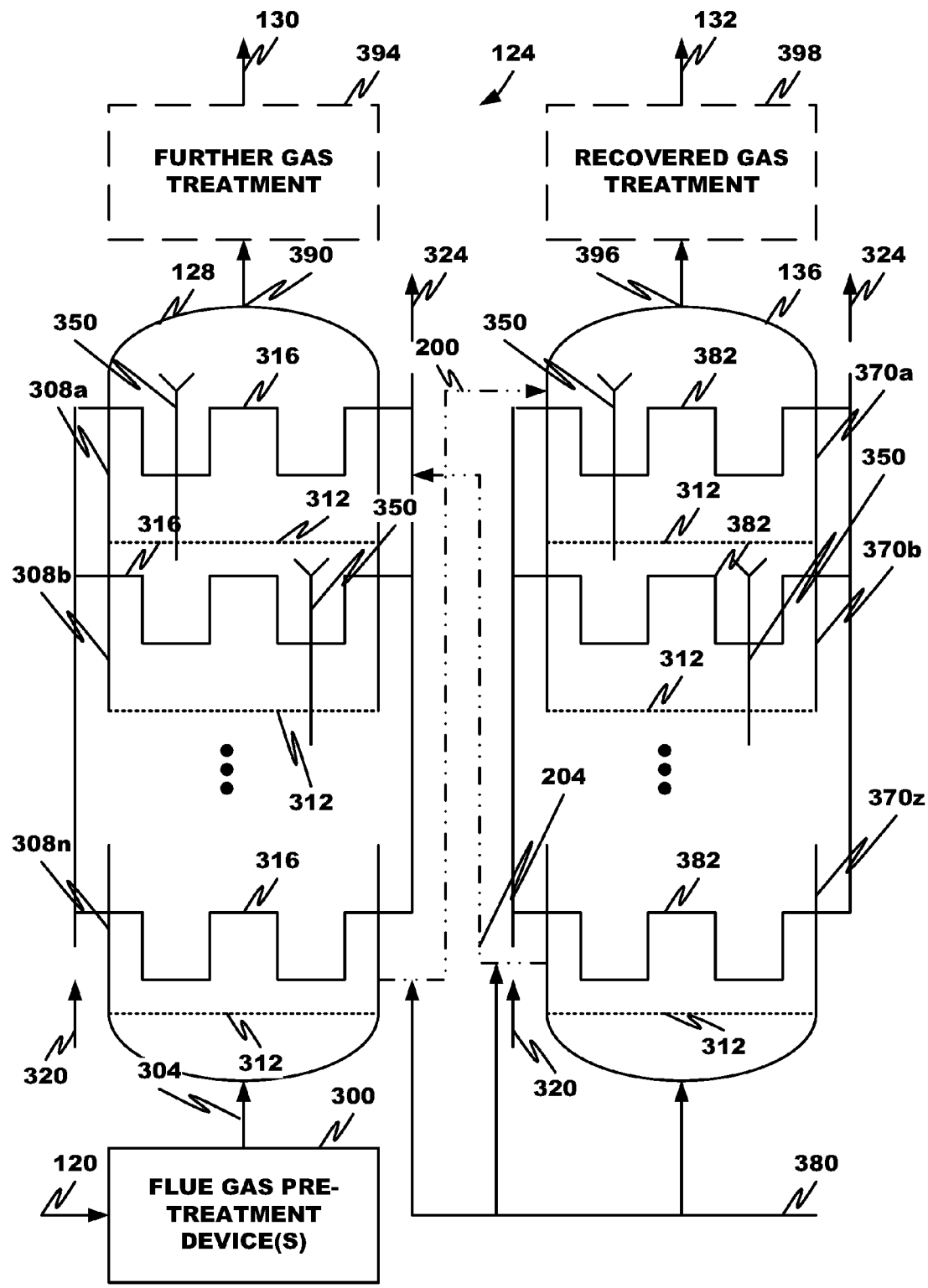
FIG. 3 is a block diagram of a separation system according to an embodiment of the disclosure.

The staged fluidized bed reactor configuration(s) will be discussed with reference to FIG. 3.

The treated gas stream 120 is passed through flue gas pre-treatment device(s) 300 to form a pre-treated gas stream 304. The gas pre-treatment device(s) 300 will be specific to the particular gas being treated. For example, it may be necessary to reduce further concentrations of other constituents, such as $SO_2$. In addition, it may be desirable to cool and/or increase the pressure of the gas. In some cases, cooling the gas or increasing the pressure could result in the condensation of water out of the gas phase. The gas pressure must be, at a minimum, sufficient to overcome any pressure drop due to the $CO_2$ capture process. Additional moisture could be removed if desired, but it may not be necessary.

The pre-treated gas stream 304 then enters a lower end of the fluidized bed separator 128 comprising first, second, . . . nth stages 308a-n. The fluidized sorbent beds are commonly staged in such a way that the $CO_2$ removal may be distributed throughout the vessel. Each stage of the fluidized bed separator comprises a distributor 312 supporting a bed of sorbent particles and a cooling device 316. As the pre-treated gas stream 304 and sorbent particles are contacted, $CO_2$ in the pre-treated gas stream 304 will be sorbed on the sorbent. Since the reaction between $CO_2$ and the sorbent is commonly exothermic, the cooling device 316 controls any temperature increase, and attempts to maintain a substantially constant temperature within the bed and across the height of the separator 128, by removing heat.

The distributor 312 separates each of the distinct fluidized bed stages and is designed to support the overlying fluidized bed from the bottom and also redistribute the fluidizing gas as it migrates through the fluidized bed separator 128 vessel. The distributors are also designed to substantially minimize pressure loss as the fluidizing gas passes through the distributor while maintaining substantially a distinct fluid bed level in each stage. These distributors can be substantially optimized to distribute the gas effectively throughout the bed of sorbent. Other features for the distributors include effectively separating entrained sorbent particles, promoting substantially even or uniform gas distribution at lower portion of fluid bed, and supporting sorbent material during abnormal operating conditions.

Figure 4:
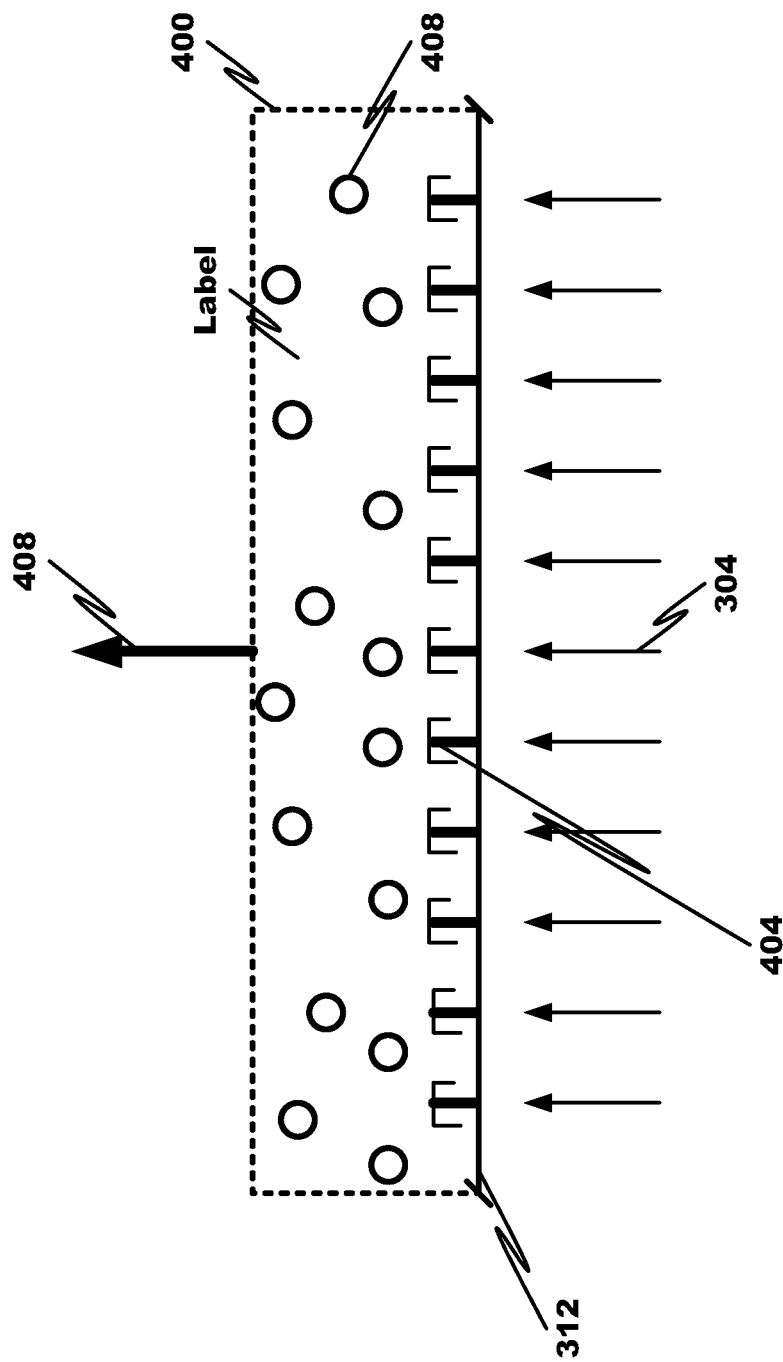
FIG. 4 illustrates a distributor according to an embodiment of the disclosure.
Figure 5:
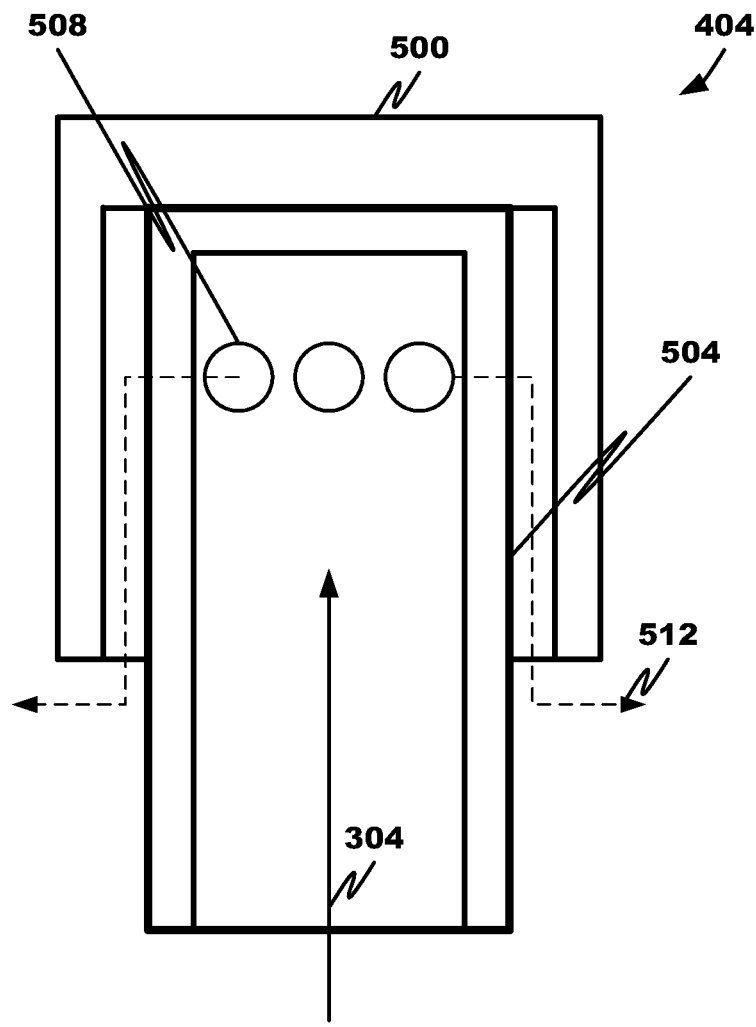
FIG. 5 illustrates a bubble cap according to the prior art.

With reference to FIGS. 4-5, the distributor 312, in one configuration, comprises a plurality of bubble caps 404a-k to receive the pre-treated gas stream 304 and fluidize the bed 400 of sorbent particles and form a partially purified gas stream 408. An exemplary bubble cap 404 is illustrated in FIG. 5. The bubble cap 404 includes a cap member 500 and a body member 504. The body member has a plurality of gas passageways 508 around its circumference to pass the pre-treated gas stream 304 circumferentially outward as shown by the dashed line 512. The cap member 500, which may be movable relative to the body member 504, inhibits substantially the sorbent particles from passing through the gas passageways 508 and through the distributor 312.

The diameters of the gas passageways 508 and areal density of bubble caps 404a-k in the distributor 312 depend on the maximum desired pressure loss as the gas passes through the distributor 312, the size and mass of the sorbent particles, and fluidizing gas velocity or flow rate. Under normal operating conditions, the sorbent particle density is commonly in the range of 160 to 1600 kg/m$^3$. The shape of the sorbent can be either spherical or non-spherical. The average particle size is commonly in the range of from about 1 µm to 10 mm. As noted, the sorbent particle bed should be fluidized in the bubbling bed regime, and when the sorbent particles are fluidized, the fluidized bed density of the bed should be 80 to 800 kg/m$^3$. In one application, the bubbles 408 moving upwardly through the bed 400 are commonly substantially uniformly sized, with a typical diameter of the bubbles being in the range of from about 0.05 cm to about 50 cm. The fluidizing gas velocity is commonly in the range of from about 0.1 to about 10 m/sec. Under these conditions, the cumulative areas of the passageways 508 in each bubble cap 404 commonly ranges from about 0.002 to about 2 cm$^2$ and the areal density of bubble caps 404 per m$^2$ of distributor 312 area is in the range of from about 100 (for the larger area bubble caps) to about 154,000 (for the smaller area) bubble caps.

Although any suitable cooling mechanism may be employed, the cooling device 316 is generally an indirect heat exchanging device that moves a cooling fluid through the bed 400 to maintain a selected temperature substantially uniformly throughout the bed volume. The adsorption reaction between the sorbent and the $CO_2$ is commonly exothermic. The cooling device 316 depicted in FIG. 3 is an indirect heat exchanger where the sorbent moves between plates or around tubing that includes a cooling media. As shown in FIG. 3, a (cold-side) cooling fluid 320 is inputted into the various cooling devices 316. The cooling fluid extracts heat from the corresponding bed of sorbent particles and forms a (hot-side) cooling fluid 324. In one configuration the thermal energy collected by the hot cooling fluid 324 is substantially removed, and the cooled cooling fluid recycled as the (cold-side) cooling fluid 320.

The separator vessel height and number of stages should be optimized based on either the $CO_2$ uptake of the sorbent at different temperatures and $CO_2$ partial pressures, sorbent kinetics, and/or the heat exchanger surface area required to complete the desired cooling.

While any suitable method may be used to transfer sorbent particles from one bed to another, a common mechanism for moving sorbent particles from an upper bed 400 to a lower bed 400 is through down comers 350, which can be either interior or exterior to the separator 128 vessel or both. As can be seen from FIG. 3, the adjacent down comers 350 are offset from one another and not aligned to prevent short circuiting of sorbent particles.

While the bed depth in each stage is shown as being substantially uniform, the beds may have differing depths. In one configuration, an upper bed, such as the uppermost bed in stage 308a, has a greater depth than a lower bed, such as lowermost bed in stage 308n, to control the operating temperature of the uppermost bed when both sensible heat and latent heat are being removed from the bed. In one configuration the sensible heat for the sorbent to change temperature from the regenerator operating temperature to the separator operating temperature will be removed primarily in the uppermost bed in stage 308a. In another configuration, the bed depths increase gradually and/or progressively along the height of the separator vessel from a lowermost bed in stage 308n to an uppermost bed in stage 308a.

After the sorbent exits the separator 128, it is transferred to the sorbent regenerator 136, which includes a plurality of stages 370a-z, each stage comprising, like the stages 308a-n of the separator 128, a distributor 312 but unlike the separator 128 heating device(s) 382 rather than cooling device(s) 316. The above description of these components applies equally to the sorbent regenerator 136. The heating device(s) 382 can be any suitable heating device, with an indirect heat exchanger being typical. In one configuration, the regenerator 136 is a single fluidized bed. In one configuration, the separator and regenerator vessels are stacked so that no sorbent conveying is necessary between the two vessels. In another configuration, some means of pneumatic, mechanical, or other conveying mechanism transports the sorbent particles between vessels. In either configuration, the sorbent addition and extraction locations in the separator and/or regenerator are separated using one or more baffles.

Although mechanical conveying of the sorbent can be utilized to transfer the sorbent from one reaction vessel to the next, to increase the reliability of the system it is preferable to minimize equipment with moving parts. Therefore, pneumatic conveying is generally used to move the sorbent from the separator 128 to the regenerator 136 and from the regenerator 136 to the separator 128. Referring to FIG. 3, the loaded sorbent particles from the lowermost stage 308n of the separator 128 are conveyed pneumatically to the uppermost stage 370a of the regenerator 136. A carrier gas 380, which may be a slip- or bleed stream of the treated and/or pre-treated gas streams 120 or 304 and/or $CO_2$-rich product gas 132. In one configuration, a slipstream of the product stream 132 is partly dried and pressurized before being used to convey the sorbent from the separator 128 to the regenerator 136 and from the regenerator 136 to the separator 128. In another configuration, flue gas, $CO_2$ lean flue gas, steam, nitrogen, or air is to convey the sorbent from the regenerator 136 to the separator 128.

The partially purified gas stream 390 output by the separator 128 and/or an intermediate $CO_2$-rich product gas stream 396 output by the regenerator 136 may require additional treatment. For example, it is possible that particulate matter may be present in either of the gas streams. In one configuration, the gas stream 390 exiting the first stage of the separator 128 (i.e., the stage with the lowest gas phase $CO_2$ partial pressure) travels through one or more cyclones in an optional further gas treatment stage 394. The cyclones are designed to capture entrained sorbent and any sorbent captured by the cyclones will be returned to the last stage of the separator 128. If any sorbent is too fine to be captured by the cyclones, a fabric filter, electrostatic precipitator, or some other means of particulate matter control may be used to control particulate emissions and capture sorbent fines. Similarly, in one configuration the gas stream 396 exiting the regenerator 136 travels through one or more cyclones in an optional recovered gas treatment stage 398 and sorbent captured by the cyclones is returned to the last stage of the regenerator 136. The cyclones are designed to capture entrained sorbent and any sorbent captured by the cyclones will be returned to the last stage of the regenerator 136. If any sorbent is too fine to be captured by the cyclones, a fabric filter, electrostatic precipitator, or some other means of particulate matter control may be used to control particulate emissions and capture sorbent fines. After the particulate matter control, in one configuration a substantial amount of the moisture is condensed out of the gas stream 396 by either pressure or thermal means. In one configuration, some of the dried gas stream 132 is used to fluidize the regenerator and/or convey sorbent between any of the vessels.

The regenerator 136 utilizes a change in temperature, pressure, or partial pressure to regenerate the sorbent and release the sorbed $CO_2$. When a temperature increase is utilized to regenerate the sorbent in the regenerator 136, the temperature can be increased through direct, indirect, or a combination of direct and indirect heating. The heat input should be sufficient to address both the sensible heat required to change the temperature of the sorbent as well as overcome the enthalpy of reaction required to release the $CO_2$ and any other sorbates, which may be endothermic. The operating temperature of the separator 128 is commonly in a range of from about 25° C. to about 500° C. and even more commonly of from about 30 to about 80° C. while the operating temperature of the regenerator 136 is commonly in a range of from about 35 to about 600 and even more commonly of from about 80 to about 150° C. The operating temperature difference between the separator 128 and the regenerator 136 is commonly in the range of from about 5 to about 300 and more commonly in the range of from about 60 to about 100° C. When a pressure change is utilized to regenerate the sorbent in the regenerator 136, the (total) operating pressure in the separator 128 is commonly in a range of from about 1 to about 150 and even more commonly of from about 1 to about 80 atm while the operating pressure of the regenerator 136 is commonly in a range of from about 0.5 to about 100 and even more commonly of from about 1 to about 20 atm. When a pressure change is utilized the operating pressure difference between the separator 128 and the regenerator 136 is commonly in the range of from about 0.5 to about 80 and more commonly in the range of from about 0.5 to about 10 atm. In one configuration, a sweep gas, either steam or a mixture of steam and $CO_2$, is injected into the regenerator 136. In the case of the staged fluidized bed regenerator 136, the $CO_2$ lean sorbent is extracted from the last stage 370z (where $CO_2$ loading is lower than the other stages).

The fluidizing gases of the separator 128 and regenerator 136 are different. In the separator 128, the fluidizing gas is the gas stream 304 from which separation of $CO_2$ or some other constituent is desired. In the regenerator 136, the fluidizing gas is $CO_2$, steam, an inert gas, or a combination thereof.

Experimental

The following examples are provided to illustrate certain aspects, embodiments, and configurations of the disclosure and are not to be construed as limitations on the disclosure, as set forth in the appended claims. All parts and percentages are by weight unless otherwise specified.

Figure 6:
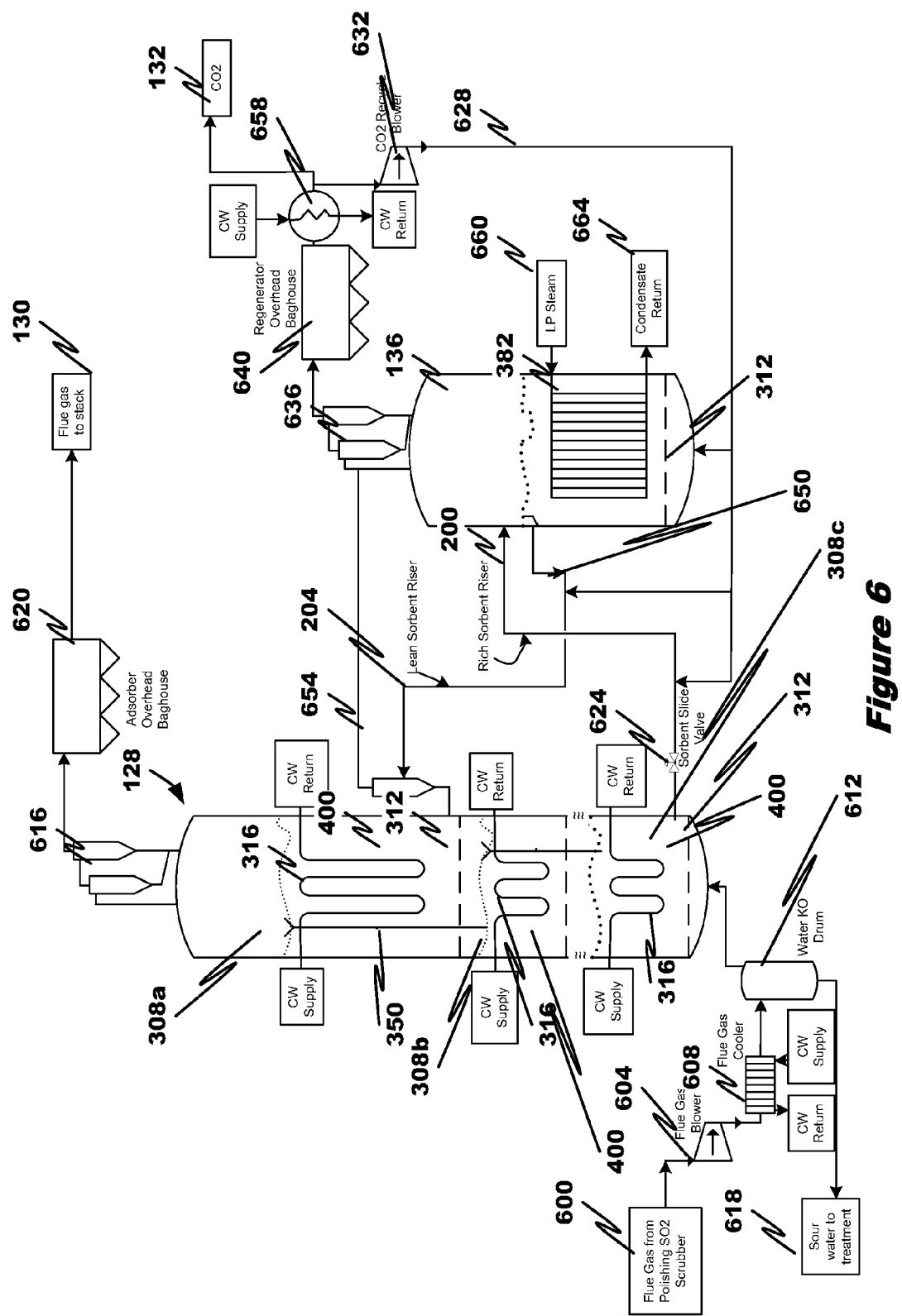
FIG. 6 is a block diagram of a separation system according to an embodiment of the disclosure.

One specific configuration of the invention is shown in FIG. 6. The configuration shown in FIG. 6 is provided only as one possible example of the equipment and process arrangement and should not be considered limiting in any way.

Flue gas from a coal-fired power plant immediately upstream of the stack (i.e., downstream of all other air pollution control equipment) is sent through a ($CO_2$ capture) fluidized bed separation system 124. In the case of a 550 MW (net basis) coal-fired power plant, one to ten trains of the fluidized bed separation system 124 may be necessary to remove 90% of the $CO_2$. For the case of one particular sorbent used in this example, the number of required trains is four. These trains will be similar in configuration, so only one is described.

In this example the flue gas 600 is slightly above atmospheric pressure, and at a temperature of 55° C. Also, the fluidized bed separation system 124 is downstream of one or more $SO_2$ scrubbers (not shown). A flue gas blower 604 is used to increase the pressure of the flue gas 600 so that the pressure is high enough to move through the separator 128. The pressure should be varied based on the sorbent properties, bed height, and many other factors. The flue gas blower 604 increases the temperature of the flue gas, which can be undesirable for $CO_2$ capture, so a flue gas cooler 608 is used to reduce the temperature of the flue gas to approximately the same temperature as the desired operating temperature in the separator. Cooling water (annotated as "CW" in the figure) in an indirect heat exchanger 316 is used to reduce the flue gas temperature. "CW Return" refers to the hot-side or heated CW, while "CW Supply" refers to the cold-side or cooled and recycled CW. A water knockout drum 612 is used to collected condensation as necessary, with the collected condensation being sour water 618 for further treatment. The flue gas 600 enters the separator 128 at the last fluidized bed stage 308c. The number of fluidized beds in the separator 128 is based on sorbent properties. Because there is an exothermic reaction between the sorbent and the $CO_2$ in the flue gas heat exchange, cooling device(s) 316, in the form of heat exchange tubes, are included in the fluidized bed(s) 400. Cooling water can be used inside the tubing to remove the heat of reaction; by this mechanism the fluidized bed can operate isothermally or near isothermally.

The temperature of the fluidized beds in the separator 128 can be controlled. The fluidized beds are operated isothermally, or near isothermally. The flue gas 600 moves at a gas velocity of approximately 0.3-5.0 m/s; the exact gas velocity is based on the sorbent particle size and particle density. The sorbent properties and the flue gas flow rate are such that the sorbent is fluidized in the Geldart A bubbling bed fluidized regime.

Although only three stages of fluidized beds are shown, the actual number of stages is varied based on the sorbent properties. Because the number of stages can be varied based on sorbent properties the separator in FIG. 6 is shown with a break in the equipment in the bottom bed 400 of stage 308c. In FIG. 6, the gas flows from the bottom fluidized bed of stage 308c to the top fluidized bed of stage 308a and the $CO_2$ concentration in the gas stream decreases during each stage. The $CO_2$ concentration in the flue gas is the lowest above the top fluidized bed of stage 308a. After the top (i.e. first) fluidized bed stage 308a, the $CO_2$-lean flue gas is directed through two cyclones 616 in series and a baghouse 620. The cyclones 616 return any captured sorbent back to the separator 128. The baghouse 620 is designed to remove sorbent too fine to be captured by the cyclones. Depending on sorbent properties this material may be returned to the separator 128 or may be deemed too small and be considered a waste product. Depending on sorbent properties, one or more of these particulate matter collection devices may not be necessary.

The $CO_2$-lean sorbent 204 is introduced into the separator 128 in the first fluidized bed stage 308a, which is on the top of the separator 128. The introduction point is below the upper solids level of the bed 400 to ensure adequate mixing and substantially minimize or inhibit short circuiting to a different bed 400. Under normal operating conditions, the sorbent is withdrawn from the bed 400 at substantially the same rate that it is added so that no net accumulation occurs. The sorbent, via down comers 350, moves from the first stage to the next stage. The down comers 350 are slightly fluidized to allow the sorbent to move from one stage to the next. The fluidization gas could be $N_2$, air, flue gas, $CO_2$ lean flue gas, steam, or $CO_2$, depending on the sorbent properties and the desired operating conditions. As the sorbent moves from one stage to the next, it becomes loaded with $CO_2$. The cooling device(s) (e.g., coils) 316 in each fluidized bed 400 remove at least most of the heat generated by the adsorption of $CO_2$. It is possible that other gases, such as moisture, could also be sorbed by the sorbent. The cooling coils can be sized to also remove the heat generated by any other heat of reactions.

The sorbent in the beds is well mixed and fluidized appropriately to achieve the mass transfer and heat transfer demonstrated by the bubbling bed fluidization regime. For one particular sorbent, the bulk density is 320-480 kg/m$^3$, depending on the moisture level. The fluidized bed density in all of the fluidized beds in the $CO_2$ capture process, described in terms of $\Delta P/L$ is 160 to 400 kg/m$^3$ depending on the sorbent and the fluidization gas velocity. The fluidized bed density is highly dependent on several operational factors that can be varied, including gas velocity, particle density, particle shape, etc. The height of each of the beds, the tops of which are shown using the dashed lines in the separator and regenerator, can be varied, but in most cases it will be determined by the amount of sorbent required to fully cover the cooling coils 316.

The height of the cooling coils 316 is dictated by the amount of heat that must be removed in each of the fluidized beds in the separator 128. The separator 128 is designed in such a way that the first (i.e. top in the case) fluidized bed 400 of stage 308a is larger in volume than the subsequent fluidized beds. The first fluidized bed 400 is larger because a greater amount of heat transfer surface area is required. The greater amount of heat exchanger surface area and volume of the first bed 400 can be attributed to the top stage 308a being responsible for the heat extraction required to reduce the temperature of the sorbent from the regenerator temperature to the separator temperature (i.e. sensible heat) as well as remove the heat due to the sorption reaction(s) (i.e. latent heat). Since the sorbent is already at the separator operating temperature when it is introduced to subsequent fluidized beds, those beds are responsible only for removing the latent heat of adsorption, which is highly sorbent dependent and could be approximately 55 to 80 kJ/mol $CO_2$. Where additional gases are sorbed, the latent heat that must be removed is increased.

The $CO_2$ loading on the sorbent increases as it moves from the first to the last bed in the separator 128. Sorbent is withdrawn from the bottom bed of stage 308c at a sorbent withdraw rate substantially equal to the overall sorbent circulation rate. The sorbent circulation rate is normally dependent on the sorbent properties (specifically $CO_2$ delta loading under operating conditions) and the desired rate of $CO_2$ removal. For the specific sorbent used as the basis of FIG. 6 and a $CO_2$ removal rate of 90% the sorbent withdraw rate from the last stage 308c of the separator, which is also the sorbent circulation rate, is approximately 4000-8000 tons/hr to obtain 90% $CO_2$ capture for a coal fired power plant approximately 550 MW$_{net}$ in size, although the sorbent circulation rate is highly dependent on sorbent properties. One specific sorbent will have a loading of 10.5 g $CO_2$/100 g fresh sorbent at the last stage of the separator; the same sorbent will have a sorbent loading of 3.5 g $CO_2$/100 g fresh sorbent in the regenerator. Therefore, for this sorbent the $CO_2$ delta loading is 7.0 g $CO_2$/100 g fresh sorbent.

The sorbent circulation rate is controlled by a sorbent slide valve 624. The sorbent is pneumatically conveyed from the separator 128 to the regenerator 136. The conveying gas 628 is a compressed $CO_2$ rich gas stream. Compression is done by a recycle blower 632. The $CO_2$ rich gas conveying stream is greater than 85% $CO_2$ by volume.

The $CO_2$ rich sorbent 200 is conveyed to the regenerator 136. The regenerator 136 has a single fluidized bed with internal heating device(s) 382 (e.g., heat exchange coils). Low pressure steam 660 is sent through the heating coils 382 and condenses on the interior walls and exits as condensate 664, which adds the temperature increase necessary to release $CO_2$ from the sorbent. Near the sorbent inlet to the regenerator 136 one or more baffles (not shown) are placed to promote sorbent mixing. The average sorbent residence time in the regenerator depends on the bed height and sorbent circulation rate but is commonly less than about five minutes.

The sorbent is fluidized using a $CO_2$ rich gas stream 628 that has been withdrawn from the product gas stream 132. Some of the gas stream 132, after treatment by cyclones 636 and baghouse 640, produces the $CO_2$ product stream 132 that can be passed through heat exchanger 658 to cool the stream and compressed for storage or used for some other purpose and lean sorbent fines 654 which are returned to the separator 128. Downstream of the regenerator overhead baghouse 640, some of the gas stream 132 is recycled using the $CO_2$ recycle blower 632. The recycled gas, which is mostly $CO_2$, is used to fluidize the $CO_2$-loaded sorbent bed in the regenerator 136, pneumatically convey loaded sorbent 200 in the rich sorbent riser (from the separator to the regenerator), and pneumatically convey the lean sorbent 204 from the regenerator to the separator in the lean sorbent rise. The sorbent exits the regenerator 136 via a dip leg 650, which is connected to the lean sorbent riser.

The sorbent cycles through the entire adsorption/regeneration process in approximately fifteen minutes or less. Sorbent can be withdrawn from several locations in the process and fresh sorbent can be added if $CO_2$ removal decreases over time.

To treat the flue gas from a large (i.e. ≥500 MW$_{net}$) coal-fired power plant, four trains of the process shown in FIG. 6 would be necessary based on the properties of one specific sorbent.

Although the invention has been developed in such a way that it is meant to operate with many different sorbents, there are several sorbent properties that should be understood. A sorbent property of high importance is the $CO_2$ loading at different temperatures and $CO_2$ partial pressures. For an ion exchange resin functionalized with an amine the $CO_2$ loading at different $CO_2$ partial pressures and temperatures is provided in FIG. 7. Although the $CO_2$ loading at different temperatures was also measured, only the separator and regenerator operating temperatures from FIG. 6 are shown for the sake of simplicity.

Figure 7:
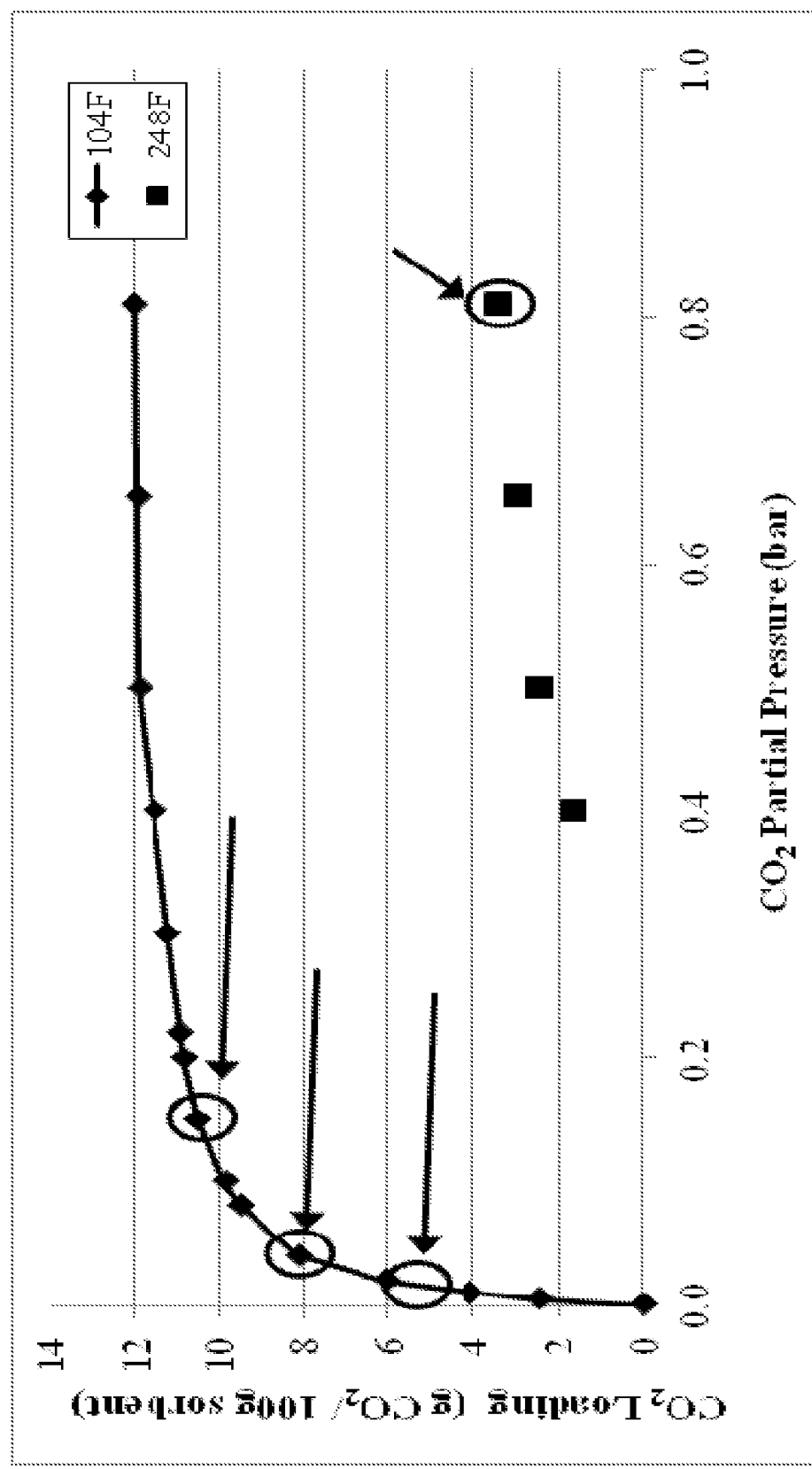
FIG. 7 is a plot of $CO_2$ loading (grams $CO_2$/100 grams fresh sorbent) (vertical axis) against $CO_2$ partial pressure (bar) (horizontal axis) for an experiment.

Although the data shown in FIG. 7 was recorded using thermogravimetric analysis in the laboratory, the relationship between sorbent $CO_2$ loading and gas $CO_2$ partial pressure can be used to understand operation of the separator and regenerator. Assuming no kinetic limitations, the sorbent leaving the regenerator is 3.5 g $CO_2$/100 g fresh sorbent at the conditions of $P_{CO2}$~0.85 bar and 248° F. (~120° C.). The sorbent enters the first stage of the separator at the conditions of $P_{CO2}$~0.015 bar and 104° F. (40° C.), which results in a $CO_2$ loading of 5.5 g $CO_2$/100 g fresh sorbent. The sorbent will then move from the first separator stage 308a to the middle separator stage 308b, which is operating at the conditions of $P_{CO2}$~0.6 bar and 104° F. (40° C.), which results in a sorbent $CO_2$ loading of 8 g $CO_2$/100 g fresh sorbent. After the middle stage 308b the sorbent will move to the last stage 308c, which operates under the conditions of $P_{CO2}$~0.15 bar and 104° F. (40° C.), which results in a $CO_2$ loading of 10.5 g $CO_2$/100 g fresh sorbent. The difference between the $CO_2$ loading in the last separator stage and the regenerator is considered the sorbent delta $CO_2$ loading, which is approximately 7.0 g $CO_2$/100 g fresh sorbent in this case. If the separator was not staged and only a single fluidized bed was used the $P_{CO2}$, $CO_2$ loading in the separator, and delta $CO_2$ loading would be lower. This would result in a larger sorbent circulation rate and a larger sensible heat requirement. Thus, staged fluidized beds in the separator is a superior means of loading $CO_2$ onto a sorbent that will be regenerated.

A number of variations and modifications of the disclosure can be used. It would be possible to provide for some features of the disclosure without providing others. The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A fluidized bed separation system, comprising:
    an input to receive a carbon dioxide-containing gas stream;
    a plurality of stacked beds fluidized by the gas stream, wherein each of the plurality of stacked beds comprise a solid sorbent to remove the carbon dioxide from the gas stream and form a purified gas stream and a carbon-dioxide loaded sorbent;
    a down comer operable to move carbon-dioxide loaded sorbent particles from a first bed of the plurality of stacked beds to a lower second bed of the plurality of stacked beds;
    a regenerator to receive, from the first plurality of stacked beds, the carbon dioxide-loaded sorbent, the regenerator comprising a heating device to heat the carbon dioxide-loaded sorbent and remove carbon dioxide from the carbon dioxide-loaded sorbent, thereby forming carbon dioxide-lean solid sorbent for recycle to the first bed and carbon dioxide gas for capture;
    first and second cooling devices in the first and second beds, respectively, wherein a heat transfer surface area of the first cooling device is greater than a heat transfer surface area of the second cooling device to remove thermal energy from sorbent regeneration and sorption of carbon dioxide; and
    an output for the purified gas stream, wherein the carbon dioxide-containing gas stream flows countercurrently to movement of the carbon-dioxide loaded sorbent particles from the first to the second beds.

2. The system of claim 1, wherein the first bed comprises the carbon dioxide-lean solid sorbent, wherein the carbon dioxide-lean solid sorbent sorbs the carbon dioxide from a gas phase, and wherein the regenerator comprises:
    a second plurality of stacked beds fluidized by a heated fluidization gas, wherein the second plurality of stacked beds comprise the carbon dioxide-loaded solid sorbent;
    a down comer operable to move the carbon dioxide-loaded solid sorbent particles from a first bed of the second plurality of beds to a lower second bed of the second plurality of beds; and
    an input for the heated fluidization gas, wherein the heated gas flows countercurrently to movement of the carbon dioxide-loaded solid sorbent particles from the first to the second beds of the second plurality of beds.

3. The system of claim 2, wherein the carbon dioxide-loaded solid sorbent desorbs the carbon dioxide into a gas phase.

4. The system of claim 3, wherein the fluidization gas is steam and wherein the carbon dioxide-containing gas stream is produced by at least one of a power plant, waste incinerator, and natural gas producer.

5. The system of claim 1, wherein the carbon dioxide is sorbed by the carbon dioxide lean solid sorbent at a first pressure and temperature and desorbed by the carbon dioxide loaded sorbent under a second set of conditions and wherein at least one of the following is true: (a) a second temperature of the second set of conditions is different from the first temperature, (b) a second pressure of the second set of conditions is different from the first pressure, and (c) a second target constituent partial pressure of the second set of conditions is different from the first partial pressure.

6. The system of claim 1, wherein the fluidizing step is performed under conditions to produce bubbling bed fluidization and wherein the one of a carbon dioxide-loaded solid sorbent and a carbon dioxide-lean solid sorbent is, under the conditions, a Geldart A material.

7. The system of claim 1, wherein the sorption of the carbon dioxide by the solid sorbent is exothermic and desorption of the carbon dioxide from the solid sorbent is endothermic.

8. The system of claim 1, wherein the heat transfer area is a heat exchanger surface area, wherein the first bed has a depth greater than the second bed, and wherein the greater bed depth of the first bed compared to the second bed controls the operating temperature of the first bed, the first bed removing both sensible heat from sorbent regeneration and latent heat from the reaction of the sorbent particles with carbon dioxide in the gas stream.

9. The system of claim 1, wherein a distributor separates the first and second beds, wherein the distributor comprises plural bubble caps, each bubble cap comprising a body member having plural gas passageways around its circumference to pass the gas stream and a cap member movably positioned on an upper end of the bubble cap, the cap member substantially inhibiting sorbent particles from passing through the gas passageways and through the distributor.

10. A fluidized bed separation system, comprising:
an input to receive a carbon dioxide-containing gas stream;
a plurality of stacked beds fluidized by the gas stream, wherein each of the plurality of stacked beds comprise a solid sorbent to remove the carbon dioxide from the gas stream and form a purified gas stream and a carbon-dioxide loaded sorbent;
a down comer operable to move carbon-dioxide loaded sorbent particles from a first bed of the plurality of stacked beds to a lower second bed of the plurality of stacked beds;
a regenerator to receive, from the first plurality of stacked beds, the carbon dioxide-loaded sorbent, the regenerator comprising a heating device to heat the carbon dioxide-loaded sorbent and remove carbon dioxide from the carbon dioxide-loaded sorbent, thereby forming carbon dioxide-lean solid sorbent for recycle to the first bed and carbon dioxide gas for capture;
first and second cooling devices in the first and second beds, respectively, wherein the first bed has a depth greater than the second bed and wherein the greater bed depth of the first bed compared to the second bed controls the operating temperature of the first bed, the first bed removing both sensible heat from sorbent regeneration and latent heat from the reaction of the sorbent particles with carbon dioxide in the gas stream; and
an output for the purified gas stream, wherein the carbon dioxide-containing gas stream flows countercurrently to movement of the carbon-dioxide loaded sorbent particles from the first to the second beds.

11. The system of claim 10, wherein a heat transfer surface area of the first cooling device is greater than a heat transfer surface area of the second cooling device to remove both sensible heat and latent heat and wherein the heat transfer area is a heat exchanger surface area.

12. The system of claim 10, wherein the first bed comprises the carbon dioxide-lean solid sorbent, wherein the carbon dioxide-lean solid sorbent sorbs the carbon dioxide from a gas phase, and wherein the regenerator comprises:
a second plurality of stacked beds fluidized by a heated fluidization gas, wherein the second plurality of stacked beds comprise the carbon dioxide-loaded solid sorbent;
a down comer operable to move the carbon dioxide-loaded solid sorbent particles from a first bed of the second plurality of beds to a lower second bed of the second plurality of beds; and
an input for the heated fluidization gas, wherein the heated gas flows countercurrently to movement of the carbon dioxide-loaded solid sorbent particles from the first to the second beds of the second plurality of beds.

13. The system of claim 12, wherein the carbon dioxide-loaded solid sorbent desorbs the carbon dioxide into a gas phase.

14. The system of claim 13, wherein the fluidization gas is steam and wherein the carbon dioxide-containing gas stream is produced by at least one of a power plant, waste incinerator, and natural gas producer.

15. The system of claim 11, wherein the carbon dioxide is sorbed by the carbon dioxide lean solid sorbent at a first pressure and temperature and desorbed by the carbon dioxide loaded sorbent under a second set of conditions and wherein at least one of the following is true: (a) a second temperature of the second set of conditions is different from the first temperature, (b) a second pressure of the second set of conditions is different from the first pressure, and (c) a second target constituent partial pressure of the second set of conditions is different from the first partial pressure.

16. The system of claim 11, wherein the fluidizing step is performed under conditions to produce bubbling bed fluidization and wherein the one of a carbon dioxide-loaded solid sorbent and a carbon dioxide-lean solid sorbent is, under the conditions, a Geldart A material.

17. The system of claim 11, wherein the sorption of the carbon dioxide by the solid sorbent is exothermic and desorption of the carbon dioxide from the solid sorbent is endothermic.

18. A fluidized bed separation system, comprising:
an input to receive a carbon dioxide-containing gas stream;
a plurality of stacked beds fluidized by the gas stream, wherein each of the plurality of stacked beds comprise a solid sorbent to remove the carbon dioxide from the gas stream and form a purified gas stream and a carbon-dioxide loaded sorbent;
a down comer operable to move carbon-dioxide loaded sorbent particles from a first bed of the plurality of stacked beds to a lower second bed of the plurality of stacked beds;
a regenerator to receive, from the first plurality of stacked beds, the carbon dioxide-loaded sorbent, the regenerator comprising a heating device to heat the carbon dioxide-loaded sorbent and remove carbon dioxide from the carbon dioxide-loaded sorbent, thereby forming carbon dioxide-lean solid sorbent for recycle to the first bed and carbon dioxide gas for capture;
first and second cooling devices in the first and second beds, respectively, wherein the first bed has a depth greater than the second bed, wherein a heat transfer surface area of the first cooling device is greater than a heat transfer surface area of the second cooling device to remove both sensible heat and latent heat, and wherein the greater bed depth of the first bed compared to the second bed and the greater heat transfer surface area of the first bed compared to the second bed controls the operating temperature of the first bed, the first bed removing both sensible heat from sorbent regeneration and latent heat from the reaction of the sorbent particles with carbon dioxide in the gas stream; and
an output for the purified gas stream, wherein the carbon dioxide-containing gas stream flows countercurrently to movement of the carbon-dioxide loaded sorbent particles from the first to the second beds.

19. The system of claim 18, wherein the heat transfer area is a heat exchanger surface area.

* * * * *